(12) United States Patent
Yaphe et al.

(10) Patent No.: US 11,553,566 B2
(45) Date of Patent: *Jan. 10, 2023

(54) LUMINAIRE FOR EMITTING DIRECTIONAL AND NON-DIRECTIONAL LIGHT

(71) Applicant: AXIS LIGHTING INC., Lasalle (CA)

(72) Inventors: Howard Yaphe, Lasalle (CA); Andrew Miles, Lasalle (CA); Giuseppe Caluori, Lasalle (CA); Alejandro Mier-Langner, Lasalle (CA); Jeffery Robert Parker, Fremont, CA (US); Frank Shum, Fremont, CA (US); Yupin Sun, Fremont, CA (US); Don Peifer, Fremont, CA (US)

(73) Assignee: Axis Lighting Inc., Lasalle (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/388,555

(22) Filed: Apr. 18, 2019

(65) Prior Publication Data

US 2019/0302339 A1 Oct. 3, 2019

Related U.S. Application Data

(63) Continuation-in-part of application No. 15/466,697, filed on Mar. 22, 2017, now Pat. No. 10,274,160.
(Continued)

(51) Int. Cl.
*F21V 8/00* (2006.01)
*F21Y 115/10* (2016.01)
*H05B 45/00* (2022.01)

(52) U.S. Cl.
CPC .............. *H05B 45/00* (2020.01); *G02B 6/009* (2013.01); *G02B 6/0021* (2013.01);
(Continued)

(58) Field of Classification Search
CPC .... G02B 6/0021; G02B 6/0073; G02B 6/009; F21V 2200/20
(Continued)

(56) References Cited

U.S. PATENT DOCUMENTS 6,217,201 B1 4/2001 Hulse
6,367,956 B1 * 4/2002 Becker ................ G02B 6/0011
362/510

(Continued)

FOREIGN PATENT DOCUMENTS

CN 105190396 12/2015
EP 2792945 10/2014
(Continued)

*Primary Examiner* — Laura K Tso
(74) *Attorney, Agent, or Firm* — Barnes & Thornburg LLP

(57) ABSTRACT

Disclosed is an LED luminaire, comprising a housing positionable at a building structure location. The housing has at least one light output boundary and configured to direct light therein toward the light output boundary. A light guide configured to be located at the light output boundary to receive light operationally contained within the housing, so as to emit non-directional light at the light output boundary. At least one first LED light engine is located within the housing, the at least one first LED light engine including at least one first LED light source to emit directional light at the light output boundary.

9 Claims, 35 Drawing Sheets

Related U.S. Application Data which is a continuation-in-part of application No. 14/936,371, filed on Nov. 9, 2015, now Pat. No. 10,180,521, and a continuation-in-part of application No. PCT/US2015/059770, filed on Nov. 9, 2015.

(60) Provisional application No. 62/077,039, filed on Nov. 7, 2014.

(52) U.S. Cl.
CPC ........ *G02B 6/0073* (2013.01); *F21V 2200/20* (2015.01); *F21Y 2115/10* (2016.08)

(58) Field of Classification Search
USPC ........................................................ 362/602
See application file for complete search history.

(56) References Cited

U.S. PATENT DOCUMENTS

| | | | |
|---|---|---|---|
| 6,755,547 B2 | 6/2004 | Parker | |
| 6,886,956 B2 | 5/2005 | Parker et al. | |
| 8,761,565 B1* | 6/2014 | Coleman | F21V 5/10 |
| | | | 385/146 |
| 8,820,951 B2 | 9/2014 | Yriberri | |
| 8,864,343 B2 | 10/2014 | Inoue | |
| 9,752,754 B2* | 9/2017 | Trincia | F21V 7/0091 |
| 10,180,521 B2* | 1/2019 | Parker | G02B 6/0001 |
| 10,274,160 B2* | 4/2019 | Parker | F21V 7/0016 |
| 2010/0046217 A1 | 2/2010 | Ngai | |
| 2012/0127739 A1 | 5/2012 | Takahara | |
| 2014/0022794 A1 | 1/2014 | Laukkanen | |
| 2014/0126235 A1 | 5/2014 | Speier et al. | |
| 2014/0140096 A1* | 5/2014 | Van Bommel | G02B 6/0011 |
| | | | 362/609 |
| 2014/0247592 A1 | 9/2014 | Hukkanen et al. | |
| 2014/0313741 A1 | 10/2014 | Sun | |
| 2016/0061387 A1 | 3/2016 | Liang | |
| 2016/0131332 A1 | 5/2016 | Broughton | |

FOREIGN PATENT DOCUMENTS

| | | |
|---|---|---|
| FI | 20040664 | 11/2005 |
| FI | 20041183 | 3/2006 |
| FI | 20041296 | 4/2006 |
| FI | 20050068 | 7/2006 |
| FI | 119704 | 2/2009 |
| FR | 2927404 | 2/2012 |
| WO | WO 2009/111494 | 9/2009 |
| WO | WO 2010/149074 | 12/2010 |
| WO | WO 2014/118426 | 8/2014 |
| WO | WO 2014/188066 | 11/2014 |
| WO | WO 2015/144990 | 3/2015 |
| WO | WO 2015/063370 | 5/2015 |
| WO | WO 2016/073987 | 5/2016 |
| WO | WO 2016/087712 | 6/2016 |

\* cited by examiner

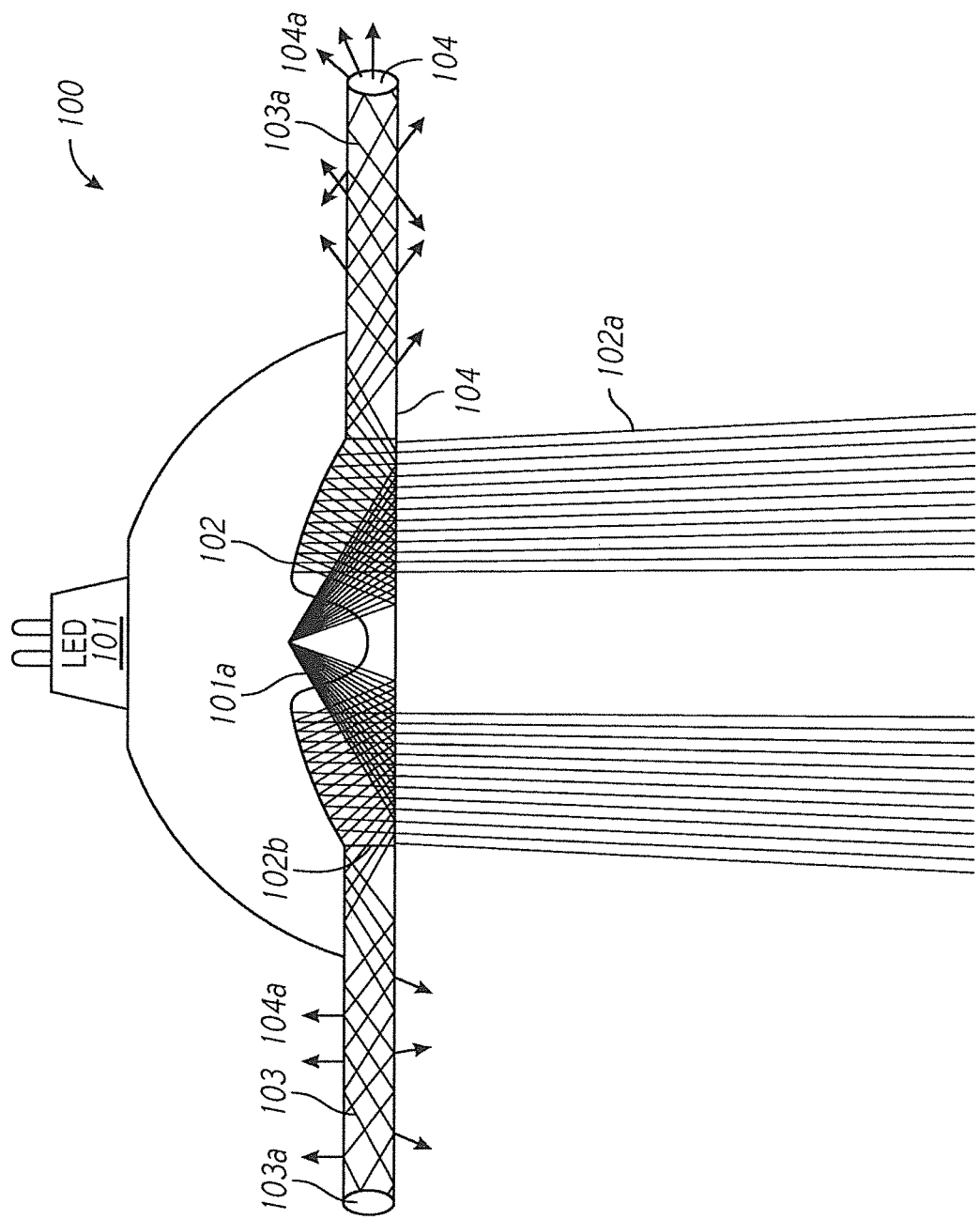

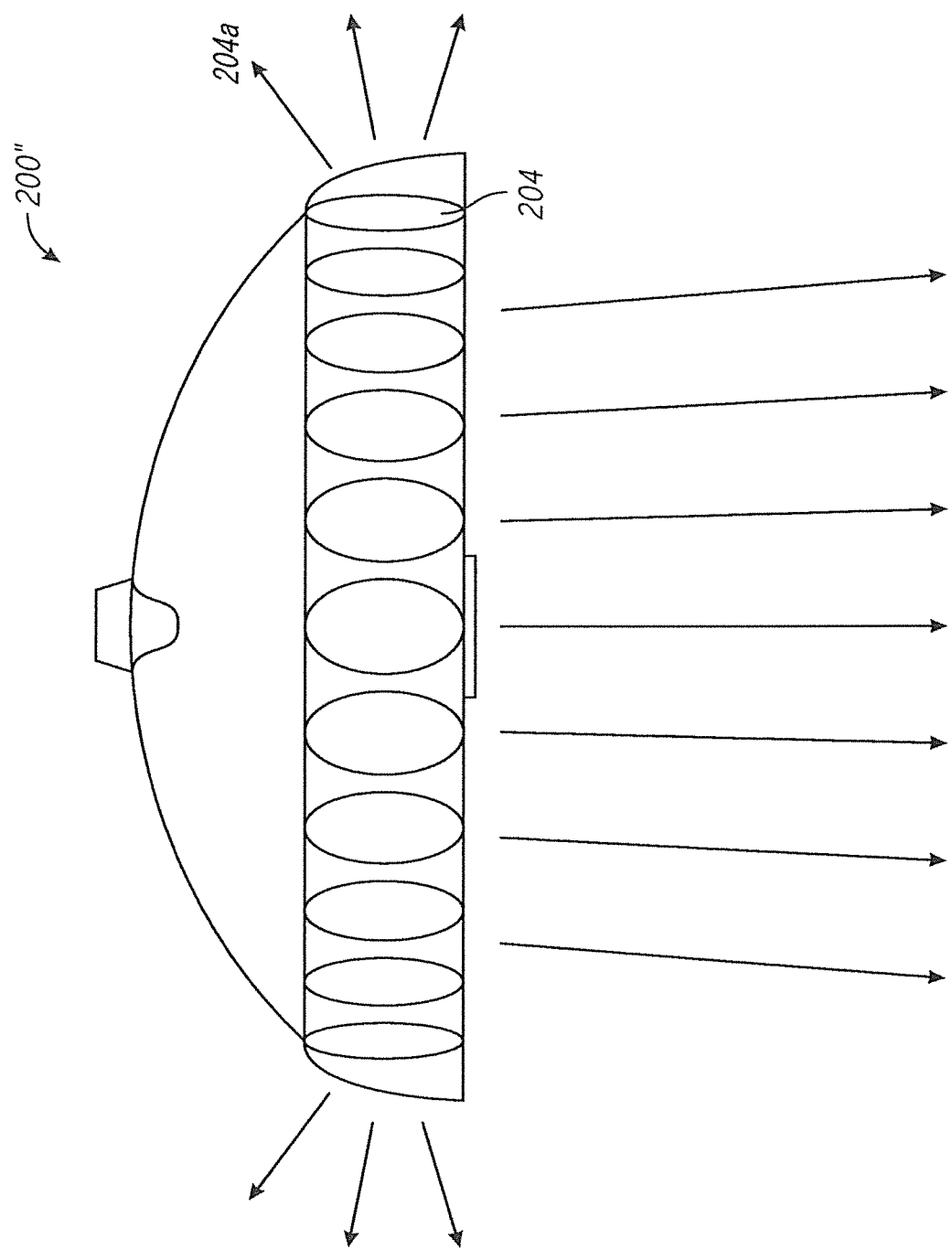

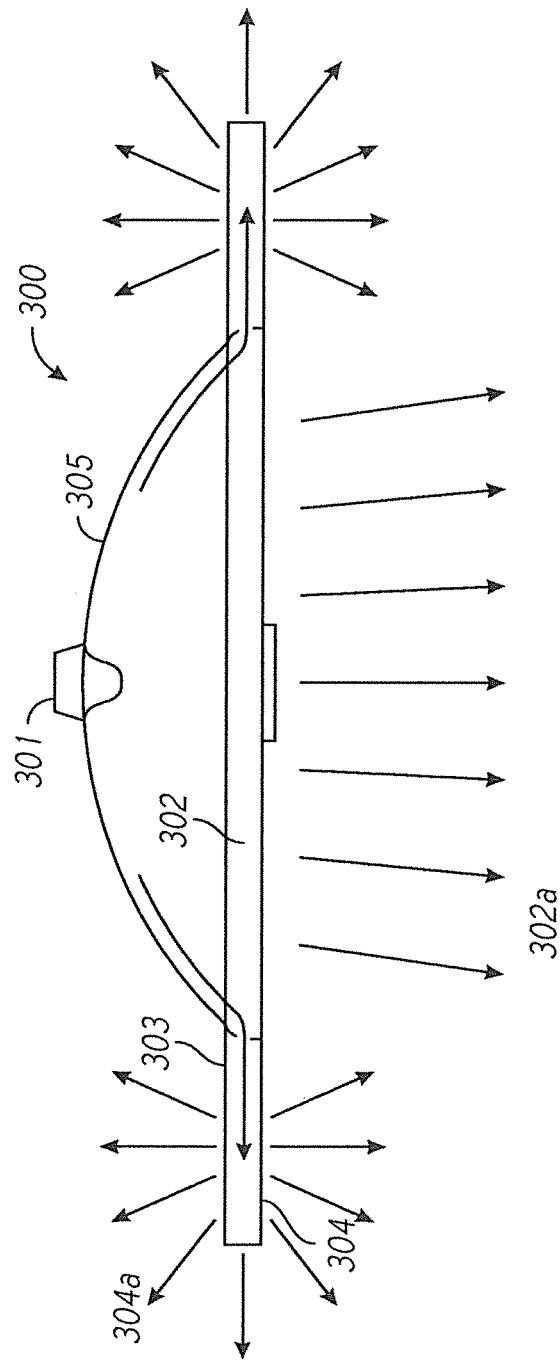
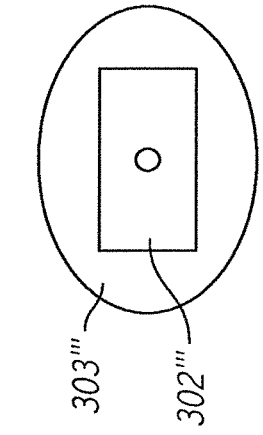
FIG. 3D
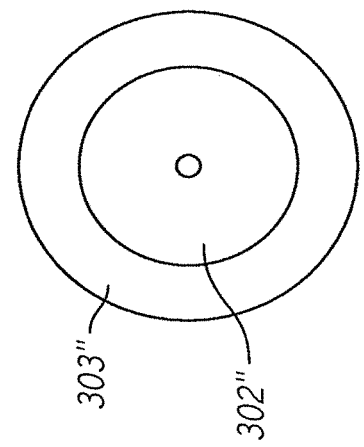
FIG. 3C
FIG. 3A
FIG. 3B

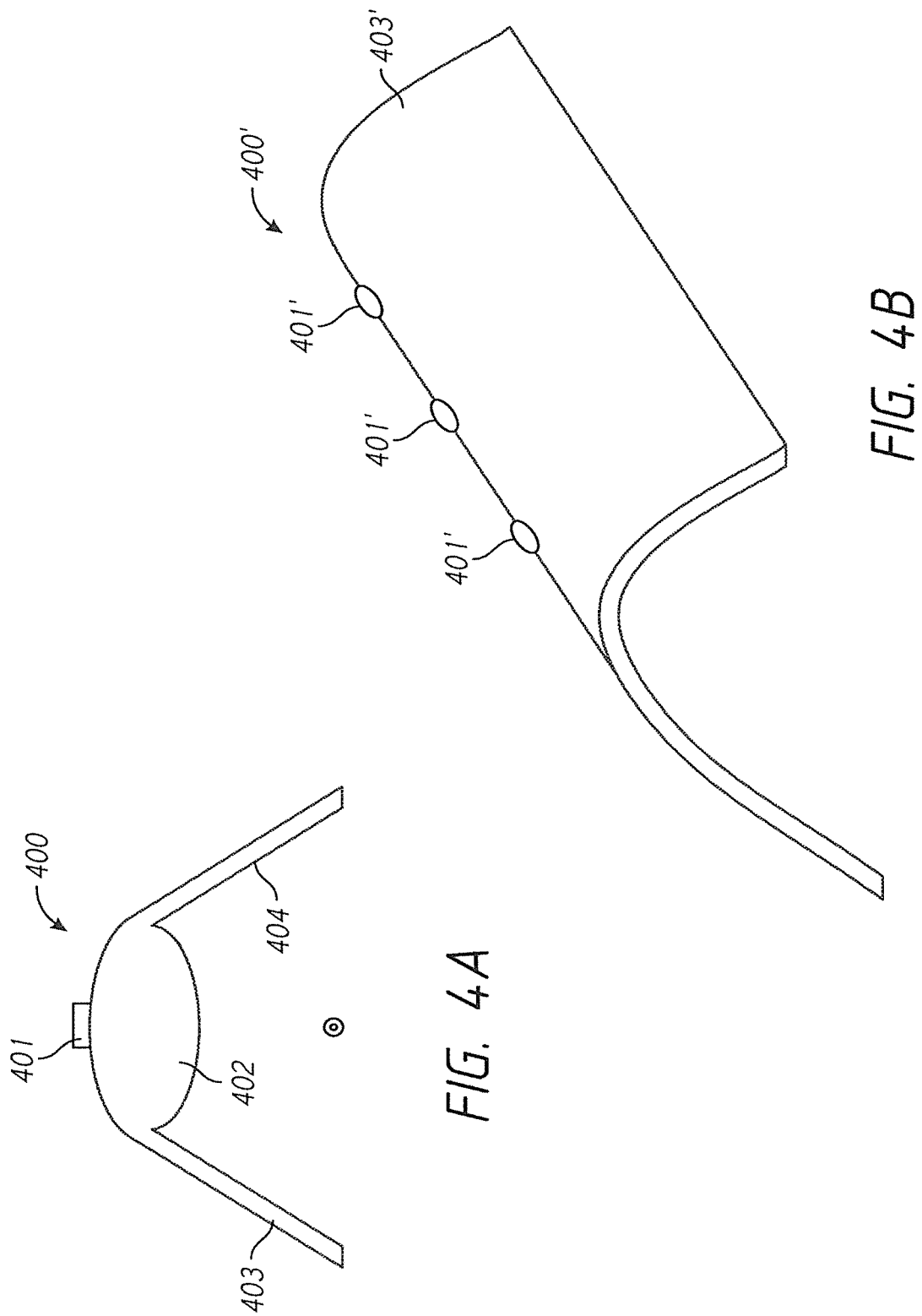

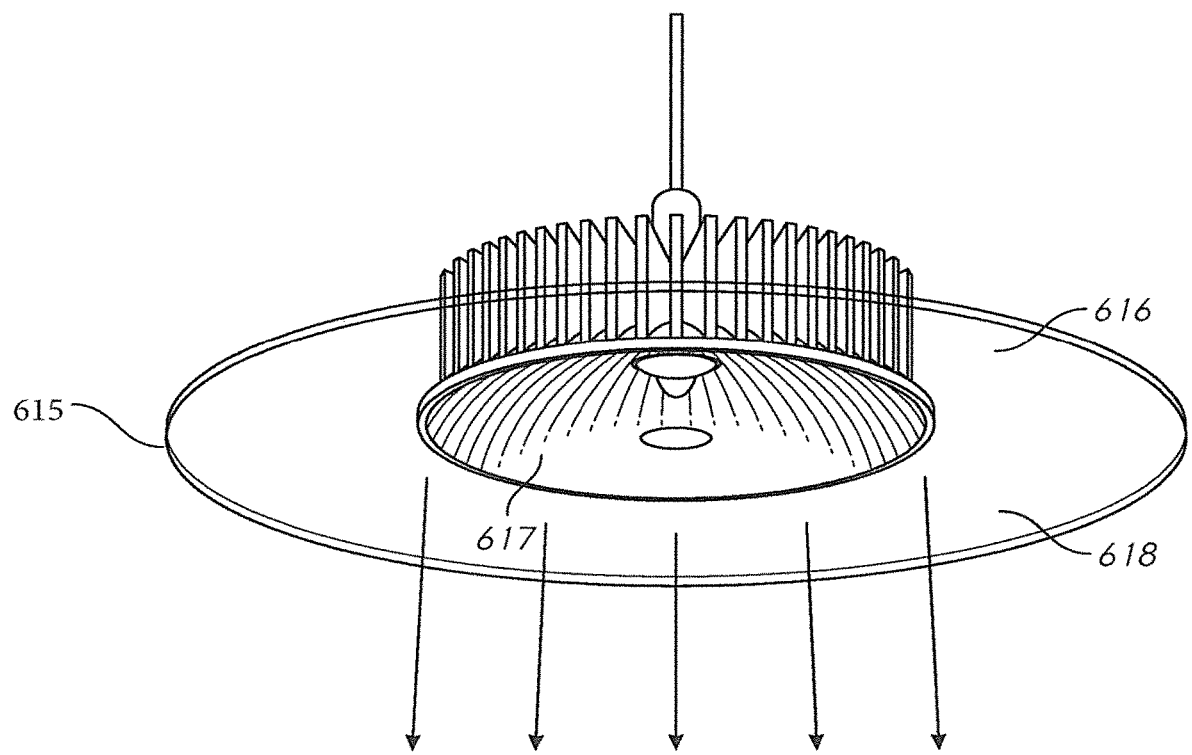
FIG. 6C1

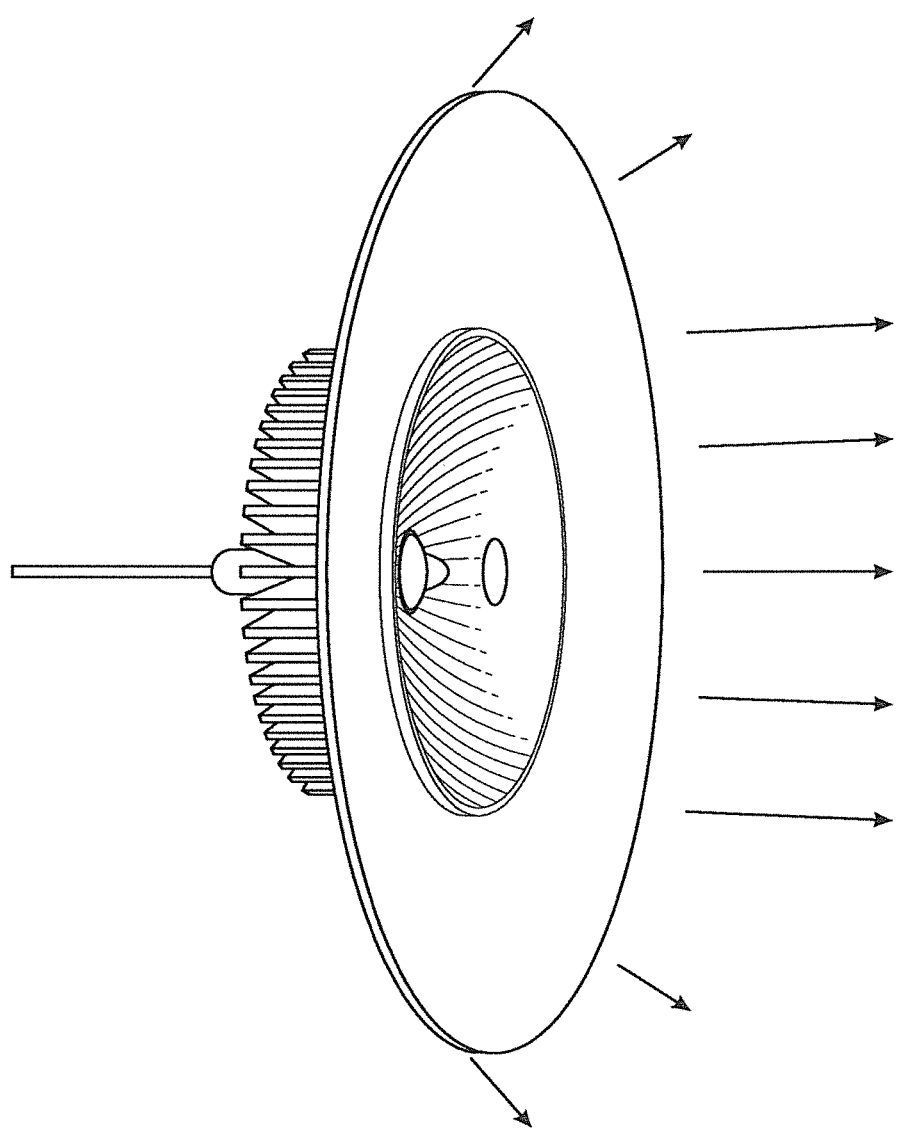
FIG. 6C2

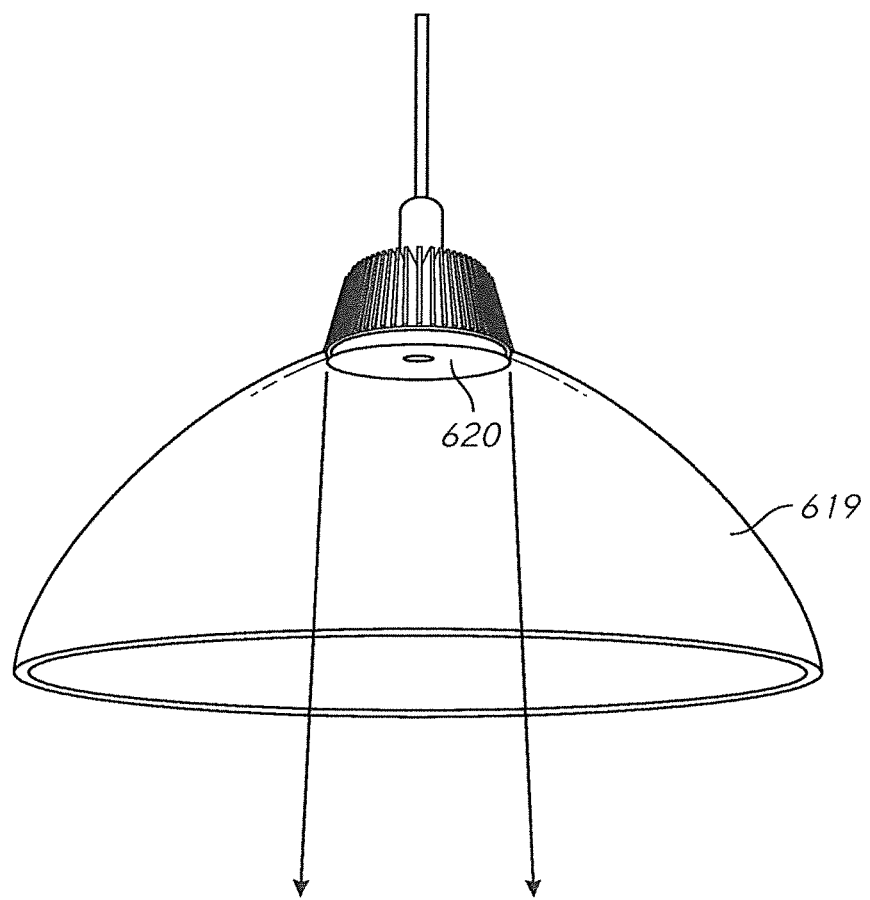
FIG. 6D1

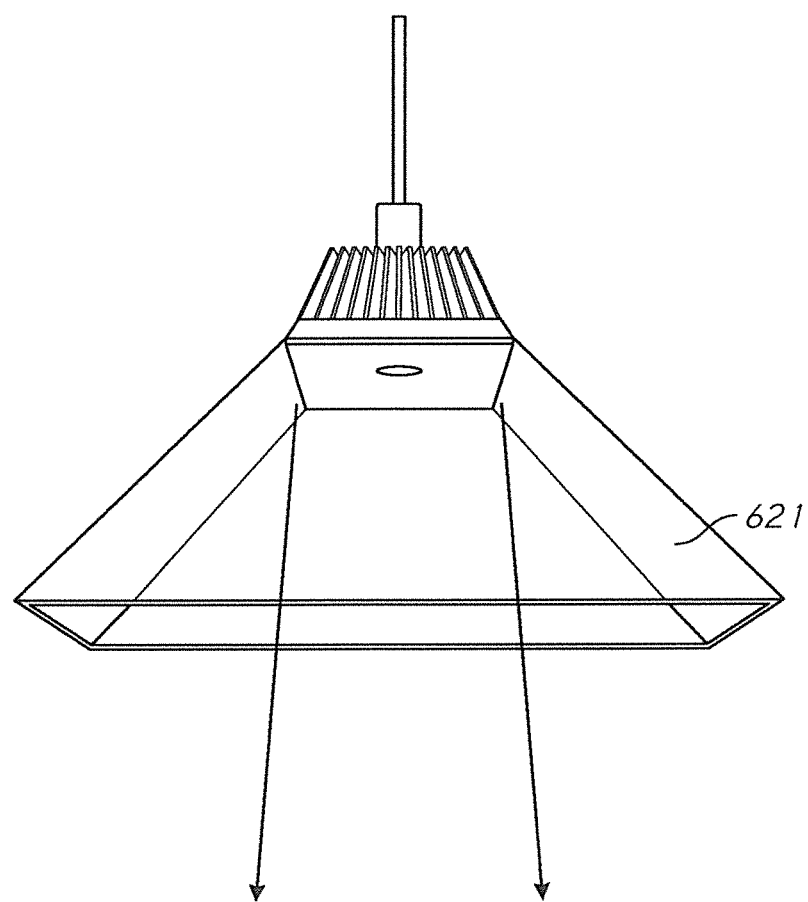
FIG. 6D2

LUMINAIRE FOR EMITTING DIRECTIONAL AND NON-DIRECTIONAL LIGHT

CROSS REFERENCE TO RELATED APPLICATIONS

This application is a Continuation-in-Part of U.S. patent application Ser. No. 15/466,697, filed Mar. 22, 2017 (now U.S. Pat. No. 10,274,160), which is a Continuation-in-Part of U.S. patent application Ser. No. 14/936,371, filed Nov. 9, 2015 (now U.S. Pat. No. 10,180,521), which claims priority to U.S. Provisional Application No. 62/077,039, filed Nov. 7, 2014. This application is also a Continuation-in-Part of International PCT application No. PCT/US2015/059770, filed Nov. 9, 2015. The disclosures set forth in the referenced applications are incorporated herein by reference in their entireties.

FIELD OF DISCLOSURE

This disclosure relates generally to the field of illumination products including luminaires, and, more particularly, to a luminaire for emitting directional and non-directional light.

BACKGROUND

Many illumination applications (e.g., luminaires) require control of the light attributes (e.g., direction or intensity) for both functional and aesthetic purposes. For example, in a workroom, high-intensity light may be directed toward one or more specific work areas, while the room is illuminated diffusely. Likewise, in a conference room, light may directed toward the table area, while diffuse, ambient light illuminates the rest of the room.

Beyond the need to provide both directional and ambient/diffuse light, Applicants recognize the need to provide ambient light along with directional light to reduce glare. Specifically, a luminaire having high-intensity light can cause glare, owing to the stark contrast between the luminaire's high intensity light-emitting surface and the surface surrounding it. Applicants also recognize that glare from high intensity light can be diminished by surrounding the high-intensity light-emitting surface with diffuse light, thereby reducing the aforementioned contrast.

Traditional approaches for providing both directional and diffuse light generally involve independently illuminating the directional and diffuse light-emitting surfaces. Often this is embodied in two or more different luminaires. This necessarily requires discrete lighting sources and driving circuitry, thus adding complexity and cost to the lighting system. Other applications involve halogen lamps, which may be configured to emit diffuse light backward for aesthetic purposes. However, halogen lamps tend to be inefficient (e.g., about 10-20 lumens/W or about 5% of theoretical light-generation efficiency), and, thus are not cost effective to operate.

Therefore, Applicants have identified a need for a luminaire that provides both directional and diffuse light in a single luminaire using efficient LED light sources, but avoids the complexity and cost of conventional lighting systems. The present invention fulfills this need, among others.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Applicants recognize that by optically coupling a directional light-emitting element with a nondirectional light-emitting surface in a luminaire, both directional and non-directional light can be can be emitted using the same light source(s). Such a configuration has a number of advantages. For example, such a luminaire configuration is simple, efficient, and cost effective because the same light source(s) can be used to emit both directional and non-directional light. Additionally, because the different light-emitting surfaces/elements are optically coupled, the contrast between them is reduced, thereby reducing glare, and generally adding to the esthetics of the luminaire's illumination. Such a configuration also facilitates the use of other technologies for controlling, for example, the direction and color of the emitted light. Other features and advantages of the luminaire system of the present invention will be apparent to those of skill in the art in light of this disclosure.

Accordingly, one aspect of the present invention is a luminaire having optically coupled directional and non-directional light-emitting surfaces. For example, in one embodiment, the luminaire comprises: (a) at least one LED light source for emitting light rays; (b) at least one directional light-emitting element optically coupled to the at least one LED light source to receive at least a portion of the light rays and being configured to emit directional light from the luminaire; (c) at least one waveguide optically coupled to the at least one LED light source to receive at least a portion of the light rays; and (d) at least one non-directional light-emitting element optically coupled to the at least one waveguide and being configured to emit non-directional light.

In another embodiment, the luminaire comprises: (a) at least one directional light-emitting element configured to emit directional light from the luminaire; (b) at least one non-directional light-emitting element configured to emit non-directional light from the luminaire, the at least one non-directional light-emitting element being optically coupled to the at least one directional light-emitting element; and (c) at least one LED light source for emitting light and being optically coupled to at least one of the at least one directional light-emitting element or the at least one non-directional light-emitting element. In one embodiment, the at least one non-directional light-emitting element comprises at least one waveguide.

In another aspect, there is provided an LED luminaire, comprising a luminaire housing defining a light output region. A light guide is configured to be located at the light output region. The light guide defines at least one directional light source location thereon. At least one LED light engine is located within the luminaire housing and comprises at least one first LED light source, and a shroud having a shroud periphery, and configured to operatively position the first LED light source therein and inwardly spaced from the shroud periphery. The shroud periphery is positionable adjacent the light guide at the directional light source location, to deliver directional light via the direct light source location to a target location, in a target region beyond the luminaire. The light guide is configured to optically couple with a light source from within the housing to define a non-directional light output to deliver non-directional light toward the target region.

In another aspect, there is provided an LED luminaire comprising a housing positionable at a building structure location and having at least one light output boundary and configured to reflect light therein toward the light output boundary. A light guide is configured to be located at the light output boundary to receive light operationally contained within the housing, so as to emit non-directional light at the light output boundary. At least one first LED light engine located within the luminaire housing, the at least one first LED light engine including at least one first LED light source to emit directional light at the light output region.

In another aspect, there is provided a luminaire providing a light output boundary. The luminaire comprises:
(a) an LED engine adjacent the light output boundary; and,
(b) a wave guide facing at least in part the LED engine and adjacent the light output boundary for receiving a portion of the output from the LED engine. The wave guide has a removed portion. The removed portion permits the transmission of directional light from the LED engine. The wave guide provides non-directional light from the received portion of output.

BRIEF DESCRIPTION OF DRAWINGS

The drawings, described below, are for illustration purposes only. The drawings are not intended to limit the scope of the present disclosure.

FIGS. 1A-1C show embodiments of a light-emitting diode (LED) luminaire of the present invention.

FIGS. 2A-2C depict various embodiments of the luminaire of the present invention in which the non-directional light-emitting element is disposed on an edge of the luminaire to diffuse light along the perimeter of the luminaire.

FIGS. 3A through 3D show different directional light-emitting element and non-directional light-emitting element embodiments of the luminaire disclosed generally in FIG. 1A.

FIGS. 4A-4B show an alternative embodiment in which the luminaire comprises a waveguide that extends from different sides of the directional light-emitting element.

DETAILED DESCRIPTION

Figure 1B:
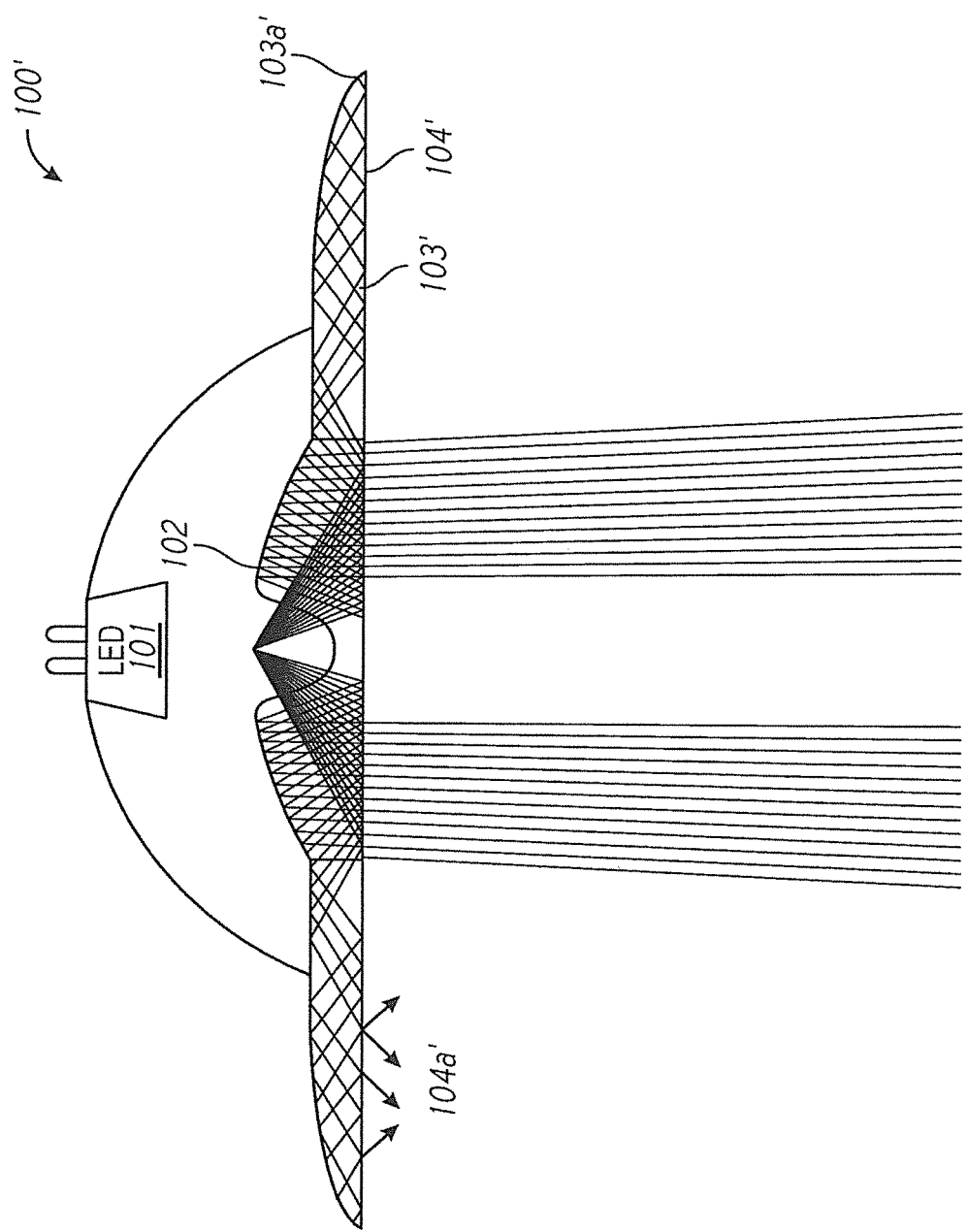
Figure 1C:
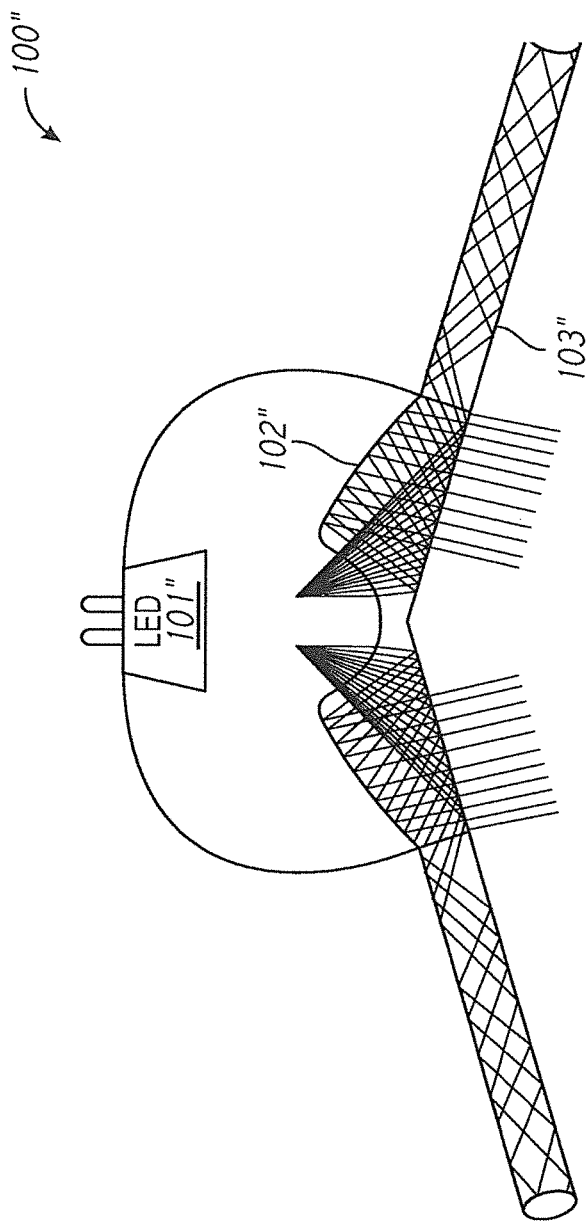

Referring to FIGS. 1A to 1C show embodiments of a luminaire providing both indirect and direct light sources, where such light sources are derived from a common plane and/or common light source. Indirect light may be generally diffuse and thus the light source may usually be a surface on a partially reflective surface or a surface otherwise configured to scatter light incident thereon. Interior surfaces of a light fixture housing may be sources of indirect light as can luminaire optics, including lenses and light guides. Thus, a direct light may typically be non-diffuse and may originate directly from a light source or be reflected by a surface, or shaped by an optic, which does not scatter the light.

Referring to FIG. 1A, one embodiment of a light-emitting diode (LED) luminaire 100 of the present invention is shown. The luminaire 100 comprises (a) at least one LED light source 101 for emitting light rays 101a; (b) at least one directional (direct) light-emitting element 102 optically coupled to the at least one LED light source 101 to receive at least a portion of the light rays 101a and to emit directional light 102a from the luminaire; (c) at least one waveguide 103 optically coupled to the at least one LED light source 101 to receive at least a portion of the light rays 101a; and (d) at least one non-directional (indirect) light-emitting element 104 optically coupled to the at least one waveguide 103 and configured to emit non-directional light 104a. These elements and selected embodiments are described in greater detail below.

As used herein, and as understood in the art, directional light rays refers to light emission patterns having a distribution of intensity which is substantially concentrated in an angular range significantly smaller than 2 pi steradians (for emission in a half-space) or 4 pi steradians (for emission in a full space). For instance, well known examples of directional light include distributions characterized by a beam angle at half-maximum, where the beam angle is no more than 40°. In one embodiment, the beam angle is no more than 30°, and, in a more particular embodiment, no more than 10°. A variety of beam profiles meet this definition including flat-top beams, Gaussian beams and others.

As used herein, non-directional light rays refers to diffuse light, which is well known to those of skill in the art. There are different ways of describing non-directional light. For example, to the extent non-directional light has a measurable beam angle at half-maximum, the beam angle is greater than 40°. However, not all light can be characterized by beams. Alternatively, non-directional light can be considered to have a near Lambertian distribution. Likewise, some non-directional light will have a near isotropic distribution.

The LED light source functions to emit light rays. Such LED light sources are well known to one skilled in the art. The LED light sources may be configured to emit any kind of light. For example, in one embodiment, the emitted light from the LED light is white, while in another embodiment, the light is violet. An LED light source may contain a single LED or multiple LEDs. In such an embodiment, the LED light sources may be configured to emit different light. For example, one LED may be a white emitting LED (violet-based and blue-based) and another is a direct violet LED, In some embodiments, the spacing and configuration of the multiple LEDs is configured to obtain a uniform distribution of light (including intensity, color, color-over-angle, etc. In some cases the materials used for the optics and waveguide are substantially transparent to violet light e.g., for instance, the absorption coefficient at 400 nm could be 1 cm-1, 0.1 cm-1, 0.01 cm-1, 0.001 cm-1 etc. Still other embodiments will be known or obvious to one of skill in the art in light of this disclosure.

Likewise, a luminaire may have just one LED light source or multiple LED light sources. LED light sources may be arranged in array and include, for example, a linear array of LED light sources or an XY matrix of LED light sources. For example, referring to FIG. 4A, a luminaire 400 is shown having a single LED source 401, while in FIG. 4B, a luminaire 400' is shown having an array of three LED light sources 401'. Suitable LED light sources are commercially available from a number of sources, including, for example, Soraa Inc. (Freemon Calif.).

The directional light-emitting element functions to receive light from the LED light source and emit it from the luminaire as directional light. In one embodiment, the directional light-emitting element is defined in a discrete directional light-emitting element, such as, for example, a discrete molded component defining multiple reflective/refractive surfaces—e.g., it may be the output facet of a directional optical lens such as a reflective lens, a prismatic lens, a total internal reflection (TIR) lens, or it may be the output facet of a reflective reflector optic such as a CPC, and still other embodiments will be known or obvious to one of skill in the art in light of this disclosure. Alternatively, the directional light-emitting element may be integrally packaged with the LED light source, or it may be integral with the waveguide, and comprise, for example, surface optics (e.g., prisms and micro-lenses) defined on the surface of the waveguide to transmit the light out of the waveguide as directional light. Still other embodiments will be known or obvious to one of skill in the art in light of this disclosure.

Figure 7A:
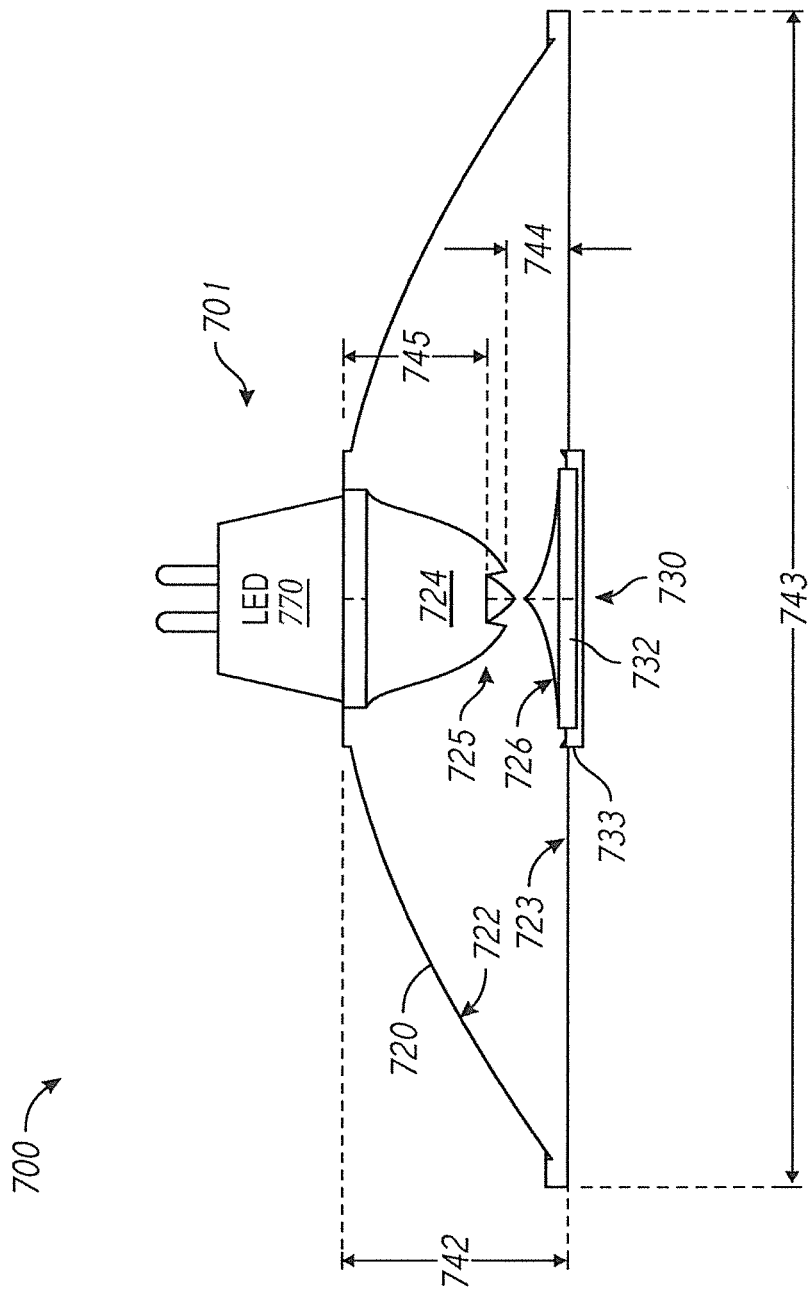
FIGS. 7A-7B show one embodiment of a directional light-emitting element of the present nvention.

The optics for emitting directional light from the LED light source are well known. For example, referring to FIG. 7A, a directional light-emitting element is shown. As shown in FIG. 7A, cross section 700 comprises a single point light source engine 701, which includes a high-intensity light source 770, a lens body 720, and a glare blocker 730. Single point light source engine 701 can have many advantages when used in multidirectional luminaires with single point source light engines, such advantages including, in part, small overall size, thin profile, smooth single-shadow light, tighter or more focused light beams (e.g., 70 degrees), uniform full spectrum color, and the like. In some embodiments, light source 770 can be an LED package subassembly or module, comprising a plurality of LEDs coupled to a voltage source (e.g., 720 volts AC) through LED driver circuitry. Further, lens body 720 can be monolithic and fabricated via a molding and/or etching process from transparent material (e.g., Makrolon® LED2245 Polycarbonate). Also, glare blocker 730 can include a magnet 732 and an opaque plastic cap 733, or can comprise other materials and combinations.

In some embodiments, lens body 720 further comprises a reflective surface 722, a forward-facing lens surface 723, and a light receiving region 724. Light receiving region 724 can also include a recessed peak 725. In some embodiments, recessed peak 725 enables the ratio of height 742 to width 743 of lens body 720 to be smaller than would otherwise be possible. For example, in various embodiments, the height 742 to width 743 ratio can be within a range of about 1:5 to about 1:7 (e.g., about 9 mm:50 mm). Recessed peak 725 further supports a minimum thickness 744 of lens body 720 between light receiving region 724 and lens surface 723 to maintain overall strength and integrity of single point light source engine 701. In other embodiments, more than one instance of recessed peak 725 can be used within light receiving region 724. Further, a minimum distance 745 can be maintained between the lens material at recessed peak 725 and light source 770. In some cases, minimum distance 745 is such that light source 770 is outside of light receiving region 724 as shown in cross section 700. Additionally, in some embodiments, lens body 720 has a sloped surface 726 above glare blocker 730. The central conical-shaped depression of sloped surface 726 helps divert light directed toward glare blocker 730 back toward the reflective surface 722.

Figure 7B:
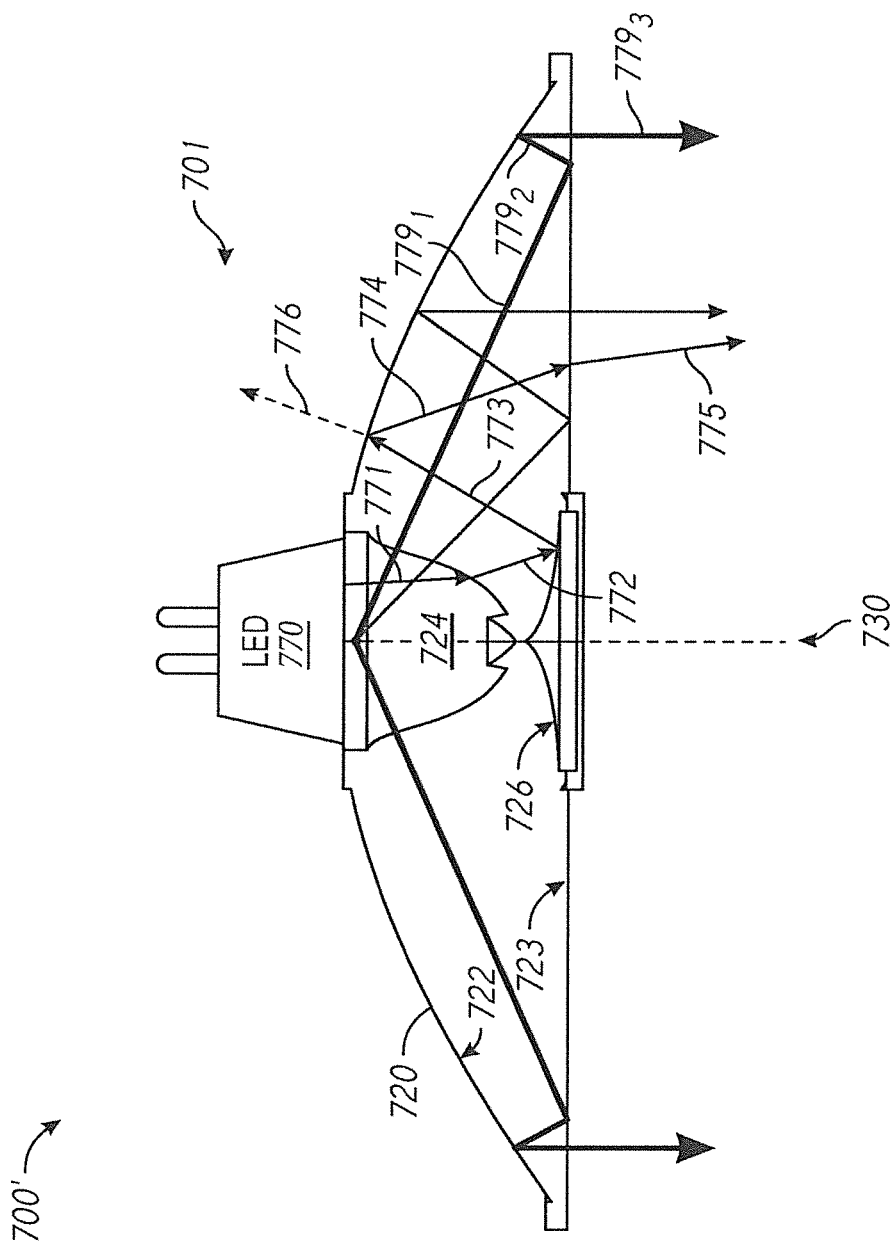

FIG. 7B shows a cross sectional view showing ray paths in a thin profile directional light-emitting element that utilizes a double bounce. Shown is an exemplary Ray 779 of the ray bundle from a source, which can be an extended source, that is TIRed at the front flat surface between ray segments $779_1$ and $779_2$, then reflected between ray segments $779_2$ and $779_3$ from the back side mirror, and finally exits the front flat surface collimated with other rays in the ray bundle. In particular, FIG. 7B comprises single point light source engine 701 shown in cross section 700 of FIG. 7A. Diagram 700' further shows light source 770 providing a high intensity light into light receiving region 724 as represented by a first light ray 771. In various embodiments, the index of refraction mismatch, the angle of incidence, and other attributes at the interface between light receiving region 724 and lens body 720, will cause first light ray 771 to bend as it enters lens body 720 as represented by a second light ray 772. Similarly, in various embodiments, the index of refraction mismatch, the angle of incidence, and other attributes at sloped surface 726 will cause second light ray 772 to be redirected toward reflective surface 722 as represented by a third light ray 773. Further, in various embodiments, reflective surface 722 changes the direction of third light ray 773 to generally be directed toward forward-facing lens surface 723 as represented by a fourth light ray 774. The substantial redirection (e.g., reflection) of third light ray 773 to form the fourth light ray 774 can be accomplished, in part, by a reflective coating on the outside of lens body 720 at rearward-facing reflective surface. Subsequently, in various embodiments, the index of refraction mismatch, the angle of incidence, and other attributes at forward-facing lens surface 723 will cause the fourth light ray 774 to be emitted from single point light source engine 701 as represented by a fifth light ray 775. Finally, reflective surface 722 can be designed (e.g., with gratings) such that a portion of the light represented by second light ray 772 will be emitted through the rear of lens body 720 of single point light source engine 701, as represented by a sixth light ray 776. The folded light path depicted by light rays 771-775 in diagram 700' enables a tighter collimation of light than is normally available from legacy light engines of equivalent depth. In addition to this advantage, the prism optics of single point light source engine 701 can have many other advantages when used in multidirectional luminaires with single point source light engines, such advantages including, in part, focused light beam definition, precise light beam adjustment, efficient light control with a single point light source, and the like.

The direction, angles, and other attributes of the light depicted by light rays 771-776 can be controlled by various techniques and approaches. For example, the shape or angle of each surface or interface upon which light is incident will directly affect the refraction (e.g., bend) of the light. This control mechanism is implemented, in part, by the molding or etching process during manufacturing of lens body 720 and related components. Further, the choice of materials used in constructionof single point light source engine 701 will impact the relative indexes of refraction and thus the refraction angles at each index transition plane. Other techniques, such as prism optics, can be deployed to control light direction. For example, reflective surface 722 can comprise a plurality of prismatic structures (e.g., triangular, sawtooth, etc.) etched into the material. In some embodiments, the prismatic structures can begin in the inner region of lens body 720 near light source 770 and extend toward the outer perimeter of lens body 720 along the contour of reflective surface 722. In other embodiments, the prismatic structures can follow other paths along the contour of reflective surface 722, such as spiral patterns, concentric patterns, scalloped patterns, and the like. The pitch between prisms, the internal angle of the prisms, the peak to trough depth of the prisms, and other attributes of the prism can further be adjusted to control the overall light direction and output of each light engine design. In addition, some embodiments can include texturing and/or coating treatments of various surfaces to control light attributes. For example, adding texture to the sidewall of the prismatic structures on a surface (e.g., reflective surface 722) will influence the distribution of light incident on the textured sidewalls to improve the attributes (e.g., intensity, color, uniformity, etc.) of the light passing through the prismatic structures. The glare cap and sloped surface 726 further provide light control by not only constraining the intensity of light in the glare range (e.g., about 30-60 degrees), but also conserving that light by redirecting it back toward reflective surface 722 to be blended with the emitted light from single point light source engine 701.

Although FIG. 7A shows a relatively large optical element, it should be understood that the invention may be practiced with a micro-optic around individual dies (for example having a size of 100 μm or 1 mm). In some cases, the LEDs are very small (e.g., 100 μm, 1 mm). The sized of the primary optic scales with the LED size. Therefore it is possible to have a primary optic having a small output port (such as 1 mm or less, or a few mm). Accordingly, it is possible to couple this light into a thin waveguide which may facilitate cost savings and semi-flexible or flexible materials.

Generally, although not necessarily, the directional light-emitting element will have a planar light-emitting surface for emitting directional light. The directional light-emitting surface may be configured in different ways. For example, it may be circular as shown in FIG. 3B, a rectilinear as shown in FIG. 3D, or any other shape.

It should be understood that the luminaire may comprise one or more directional light-emitting elements. For example, referring to FIG. 6A, a luminaire is shown having a single directional light-emitting element, while FIG. 6F a luminaire is shown having three directional light-emitting elements.

Additionally, the directional light-emitting elements may be a combination of one or more discrete directional light-emitting elements and one or more directional light-emitting elements integrated with the LED light source or waveguide.

The optical coupling configuration between the directional light-emitting element and the LED light source can vary. In one embodiment, the directional light-emitting element receives light directly from the LED light source. In such an embodiment, the directional light-emitting element may be optically-coupled to the LED light source in a variety of different ways. For example, in one embodiment, one directional light-emitting element may be coupled to each LED light source, as shown, for example, in FIG. 6F. Alternatively, in one embodiment, multiple LED light sources are optically-coupled to a single directional light-emitting element as shown, for example in FIG. 4B. In that embodiment, just one directional light-emitting element is coupled to the array of three LED light sources. In yet another embodiment, there may be multiple light-emitting directional light-emitting elements optically-coupled to a single light source (see, e.g., FIG. 5). Still other embodiments would be obvious to those of skill in the art in light of this disclosure.

Rather than the directional light-emitting element being optically coupled directly with the LED light source, in another embodiment, the directional light-emitting element receives light from the LED light source through the waveguide. In other words, the directional light-emitting element is not directly optically coupled with the LED light source. In such an embodiment, the directional light-emitting element may be defined on the waveguide surface. For example, referring to FIG. 5, a luminaire 500 is shown having two waveguides 503 extending outwardly from the LED light source 501. On the bottom of each waveguide, the directional light-emitting element 502 is defined such that the directional light-emitting element emits directional light 502a downward as shown. Alternatively, the directional light-emitting element may be discrete and optically coupled to the waveguide using known optical coupling techniques.

In one embodiment, the luminaire further comprises means of focusing the directed light from the directional light-emitting element. For example, in one embodiment, the directional light-emitting element can be moved independently in one or more directions relative to the luminaire, thus allowing the directional light to be targeted on a particular object. Alternatively, rather than physically moving the directional light-emitting element, lensing can be used to direct the light. For example, lenses as disclosed in U.S. application Ser. No. 14/804,060, filed Jul. 20, 2015, hereby incorporated by reference, may be used to focus the light as shown in FIG. 6N, in which the directional light is focused on art work, while the non-directional light surrounds the directional light-emitting elements, thereby minimizing glare. Still other embodiments will be known or obvious to one of skill in the art in light of this disclosure.

In one embodiment, the luminaire further comprises filters or lenses and other color-modifying optical elements to alter the shape or color/temperature of the light. Such filters and lenses are disclosed, for example, in U.S. Pat. No. 9,109,760, hereby incorporated by reference.

The waveguide functions to direct the propagation of light from the LED light source within certain confines. Such waveguides are well-known and include, for example, optically transparent materials, such as glass or plastic having a refraction index significantly different from that of air such that the interface of the waveguide material and air results in internal reflection. Alternatively, the waveguide may be hollow and have reflective surfaces to inwardly reflect the light as it propagates down the waveguide. Still other waveguides suitable for the present invention will be obvious to those of skill in the art in light of this disclosure.

The waveguide may be optically-coupled to the LED light source in a variety of different ways as discussed above in connection with the directional light-emitting element. For example, in one embodiment, the waveguide is optically-coupled directly to the LED light source. For example, referring to FIG. 5, a luminaire is shown having two waveguides optically coupled directly to the LED light source as described above.

Furthermore, like the directional light-emitting element described above, the waveguide can be optically-coupled to a single LED light source, or multiple waveguides can be coupled to a single light source, or a single waveguide may be optically coupled to multiple LED light sources. Again, those of skill in the art will understand these embodiments and others in light of this disclosure.

In another embodiment, the waveguide receives the light rays from the light source through the directional light-emitting element. For example, referring to FIG. 1A, the luminaire 100 is shown having a directional light-emitting element 102 optically coupled to a waveguide 103 on which the non-directional light-emitting element 104 is defined. The directional light-emitting element 102 is coupled to the waveguide 103 at its periphery 102B. Light exits the edge 102B of the directional light-emitting element 102 and enters the waveguide 103. Light entering the waveguide 103 from the edge 102B propagates down the light waveguide 103 until it reaches a light-emitting surface 104, which emits non-directional light 104A. Still other coupling approached will be known or obvious to one of skill in the art in light of this disclosure.

Figure 5:
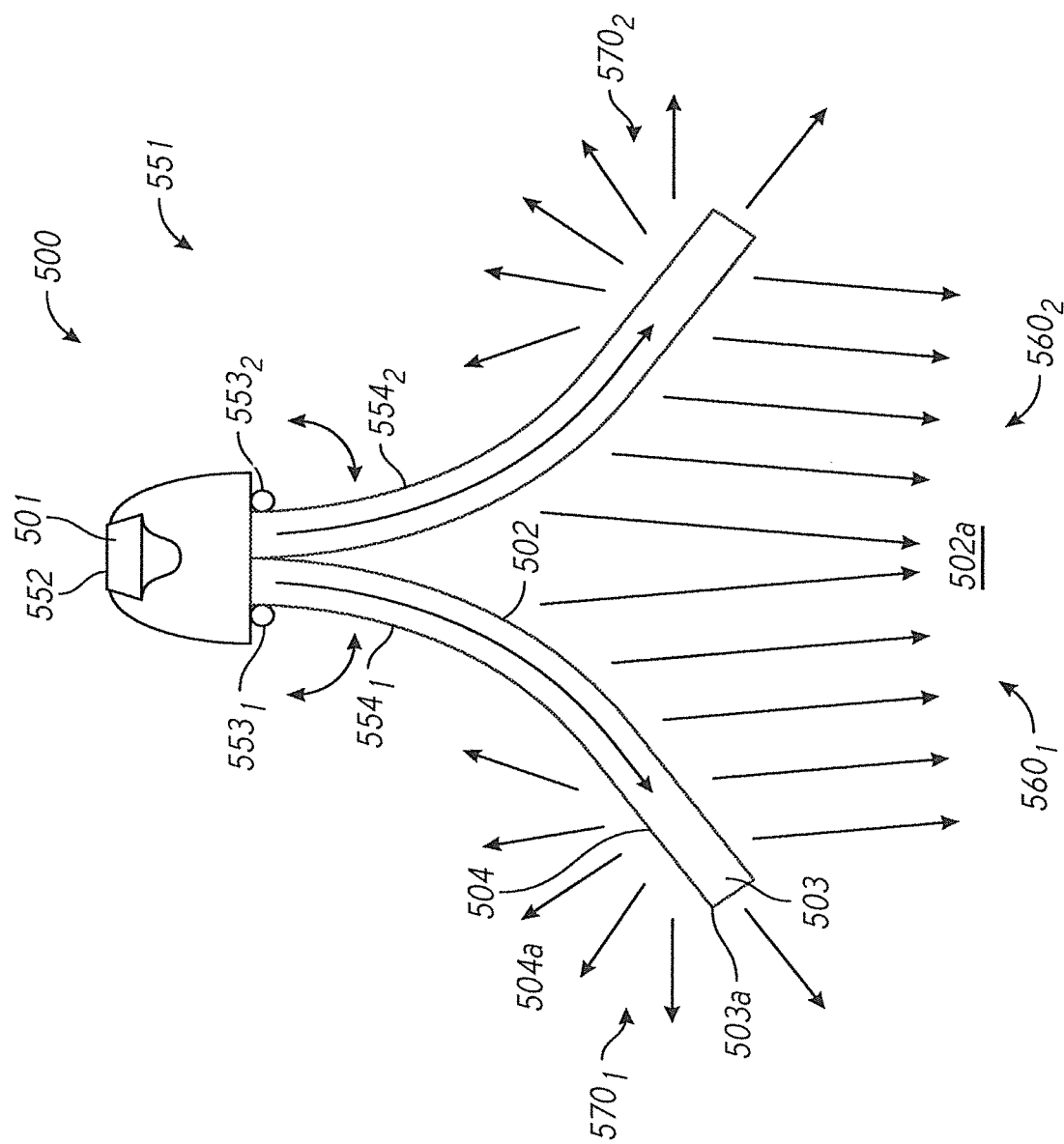
FIG. 5 shows an alternative embodiment of the luminaire of the present invention.

The waveguide's cross section may vary according to the application. For example, it may be flat, curved, wedge-shaped, undulating, etc. Furthermore, the waveguides may be configured in a variety of ways with respect to the directional light-emitting element. For example, in one embodiment, the waveguide encircles the directional light-emitting element as shown in FIG. 6B. Furthermore, referring to FIGS. 6F-6G, a luminaire is shown in which a single waveguide encircles multiple directional light-emitting elements in an undulating shape and in a rectilinear shape, respectively. In another embodiment, discrete waveguides extend in different directions from one or more directional light-emitting elements as shown in FIG. 5.

The waveguide can be designed with various dimensions (e.g., height, curvature, etc.) and features (e.g., surface structures, translucency gradients, color gradients, etc.) to provide control of the attributes (e.g., direction, intensity, color, etc.) of indirect light. Specifically, in some embodiments, waveguide can have a light transition area at which light from single point light source can be transmitted from light-emitting into waveguide. More specifically, in some embodiments, at least a portion of light-emitting element can be bonded to the waveguide to eliminate air gaps, decrease surface reflections and/or eliminate any lens effect between the light-emitting portions and the waveguide, thereby reducing light loss and increasing the light output from waveguide. Further, in some embodiments, waveguide can include reflective or refractive surfaces (e.g., prismatic structures) for changing the path of a portion of the light from single point light source that would not normally enter waveguide at an acceptable angle, allowing light to remain in waveguide for a longer period of time and/or increase the efficiency of waveguide.

The non-directional light-emitting element functions to receive light from the waveguide and emit non-directional light rays as described above. Configurations for the non-directional light-emitting element are well known in the art. For example, in one embodiment, the non-directional light-emitting element is integrated with the waveguide. For example, referring to FIG. 1A, a luminaire 100 is shown in which the non-directional light-emitting element 104 is a portion of the surface of the waveguide. In this embodiment, optical element(s) may be disposed on a surface of the waveguide to facilitate the emission of light from the waveguide. Such surface structures include, for example, micro lenses, prisms, roughening, channels, grooves, and the like. In some embodiments, the waveguide may also include a pattern of light extracting deformities or disruptions (e.g., prismatic structures) which provide a desired light output distribution from waveguide by changing the angle of refraction of a portion of the light from one or more light output areas of waveguide. For example, non-directional light from waveguide can be controlled to emit only in a downward direction, an upward direction, or horizontally from the edge, or any combination of these directions.

Alternatively, the non-directional light-emitting element may be a discrete non-directional light-emitting element optically coupled to the waveguide. Suitable non-directional light-emitting elements will be obvious to those of skill in the art in light of this disclosure. For example, in one embodiment, the non-directional light-emitting element is an optical element configured to receive light from the waveguide and having a surface or volume comprising light scattering features to diffuse light.

In one embodiment, the spectrum emitted from the directional light-emitting element and the spectrum emitted from the non-directional light-emitting element are different. For instance, in one embodiment, the correlated color temperature (CCT) of the directional light and that of the non-directional light are different by using, for example, the techniques disclosed in U.S. application Ser. No. 14/191,679, filed Feb. 27, 2014, herein incorporated by reference. In one particular embodiment, the non-directional light is configured to have a glowing edge, which may, for example, represent the "brand color" of a company.

As mentioned above, the non-directional light-emitting element is configured to substantially reduce glare by reducing the contrast between the directional light-emitting eleme and the non-directional light-emitting element. In one embodiment, the non-directional light-emitting element is configured with a light intensity such that it emits a relative amount of luminous flux at angles 70-90° (from the vertical plane) which is less than 10%, preferably less than 3%, more preferably less than 1%, and even more preferably less than 0.1% of the total luminous flux of the system.

It should be noted that various features described herein may be mixed and matched to provide many permutations of the luminaire of the present invention.

Some of the embodiments described above are illustrated in the attached figures.

Referring to FIGS. 1A-1C, schematic cross sections showing ray diagram of certain embodiments of the luminaire of the present invention are shown. The luminaire 100 is shown has an LED light source 101. It should be understood that the light 101 shown in this embodiment may be a single LED light source or it may be a plurality of LED light sources 101 arranged in a linear array essentially running perpendicular to the page. The luminaire 100 also has an essentially flat waveguide. In the particular embodiment of FIG. 1A, the top and bottom surfaces of the waveguide are configured to be the non-directional light-emitting elements 104 as described above. Additionally, in this embodiment, the distal end 103A of the waveguide comprises a diffuse optical element (lens or other element) such that light reaching the distal end 103A of the waveguide 103 is diffused. In such an embodiment, the diffuse lens is part of the non-directional light-emitting elements. Alternatively, rather than disposing a diffuse lens at the distal end 103A of the waveguide, a reflective surface may be used such that the light is reflected back through the waveguide, thereby facilitating its exit through the non-directional light-emitting elements 104 on the top and/or bottom surface of the waveguide 103.

Referring to FIG. 1B, another embodiment of the luminaire 100' is shown which is similar to that as described with respect to FIG. 1A, except the distal ends 103a' of the waveguide 103' are tapered, thereby causing the light to exit the non-directional light-emitting element 104' through the bottom as shown. Specifically, light entering the waveguide 103' from the edge 102B' of the directional light-emitting element propagates down the waveguide 103' towards the distal end 103A' of the waveguide. As the light propagates, the waveguide becomes thinner, effectively squeezing non-directional light 104a' out through the non-directional light-emitting element 104' defined on the bottom of the waveguide as shown.

Referring to FIG. 1C, yet another embodiment luminaire 100" is shown. This embodiment is similar to that of FIG. 1A except that the waveguides 103" are angled inward, thereby focusing the directional light. With respect to the waveguide 103" it should be understood that, as shown in this cross section, the waveguide 103" may comprise two (2) discrete waveguides that are elongated running essentially perpendicular to the page, or, alternatively, it may comprise a single waveguide that encircles the directional light-emitting element 102" optically coupled to the LED light source 101" as discussed for example in FIG. 3B-C.

Figure 2A:
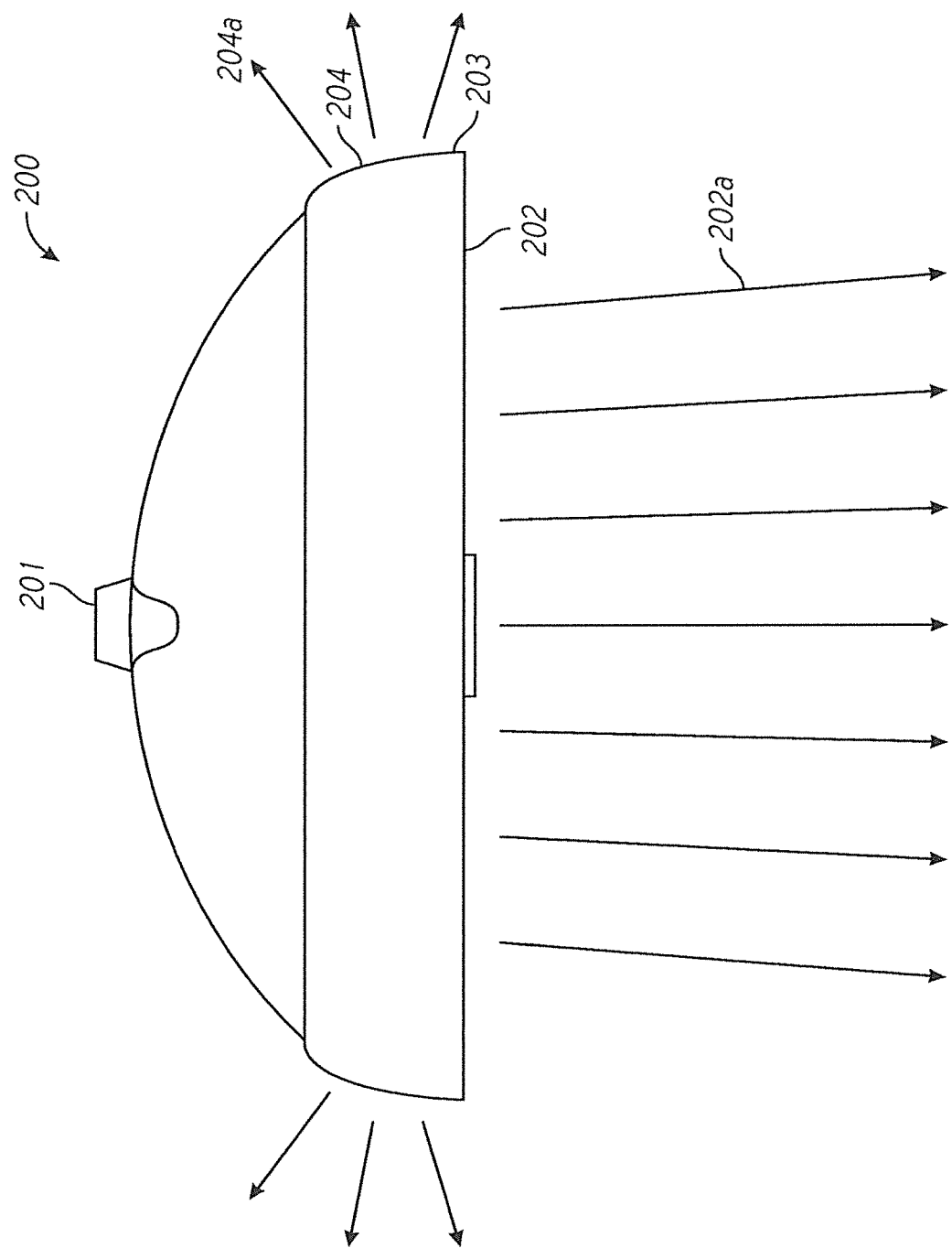
Figure 2B:
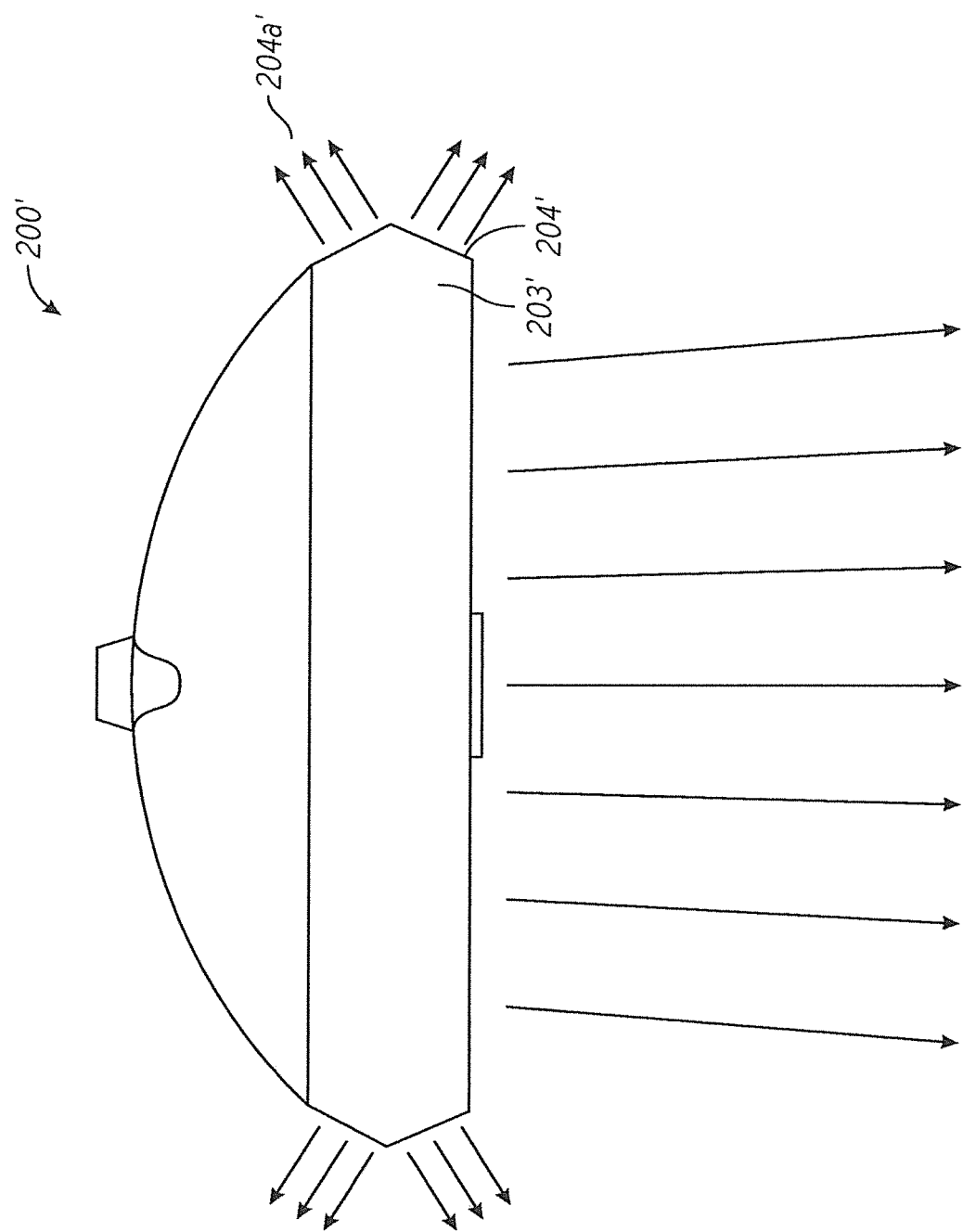

FIGS. 2A-2C depict various embodiments of the luminaire of the present invention in which the non-directional light-emitting element is disposed on edge of the luminaire to diffuse light along the perimeter of the luminaire. The embodiment of FIG. 2A has the directional light-emitting element 202 is defined on the bottom of the luminaire such that light from light source 201 is emitted as directional light 202A downward, while light propagating down along the waveguide 203 is emitted as non-directional light 204A along the edge or perimeter of the luminaire from the non-directional light-emitting element 204.

Referring to FIG. 2B, a second embodiment of the luminaire 200' is shown. This embodiment is substantially similar to that of FIG. 2A, except the non-directional light-emitting element 204' at the end of the waveguide 203' has one or more facets for the emitting non-directional light 204A'. In FIG. 2C, another embodiment of the luminaire 200" is disclosed, in which the non-directional light-emitting element 204 comprises a number of lenses, such as ellipsoid lenses, which serve to emit non-directional light 204A in a decorative pattern.

FIGS. 3A through 3D show different directional light-emitting element and non-directional light-emitting element embodiments of the luminaire disclosed generally in FIG. 1A. Like luminaire 100, luminaire 300 comprises a light source 301, a reflective housing 305, a directional light-emitting element 302 to receive the light rays from the light source 301 and to admit directional light 302a. Additionally, the directional light-emitting element 302 is optically-coupled to the waveguide 303 such that light rays from the light source 301 are optically-coupled into the waveguide 303 and then are emitted by the non-directional light-emitting element 304 as non-directional light 304a. As mentioned above with respect to FIG. 2A, there are different embodiments of the waveguide 303. For example, referring to FIG. 3B, a square waveguide 303' surrounds or encircles a circular directional light-emitting element 302'. In the embodiment of FIG. 3C, a circular waveguide 303" encircles a circular directional light-emitting element 302". In the embodiment of FIG. 3D, an elliptical waveguide 303' encircles a square directional light-emitting element 302'. Still other embodiments will be known to those skilled in the art in light of this disclosure.

Referring to FIG. 4A, an alternative embodiment is disclosed in which the luminaire 400 comprises a waveguide 403 that extends from different sides of the directional light-emitting element 402. The directional light-emitting element 402 emits directional light downward, to illuminate, for example, a table top. In such an embodiment, the non-directional light-emitting element 404 may be, for example, on the underside of the waveguide 403 to reduce glare. Alternatively, or in addition to, the non-directional light-emitting element 404 may be defined on the top of the waveguide 403 to provide ambient light. The waveguide portion 403 can be designed with various dimensions (e.g., height, curvature, etc.) and features (e.g., surface structures, translucency gradients, color gradients, etc.) to provide control of the attributes (e.g., direction, intensity, color, etc.) of indirect light. It should be also understood that the waveguide; 403 may comprise two discrete waveguides that extend on either side of the directional light-emitting element 402 and perpendicular to the page. In another embodiment, it may comprise a single waveguide that extends around the directional light-emitting element 402.

As shown in FIG. 4B, the luminaire 400' may have waveguides that are asymmetrical about the LED light source 401'. In this embodiment, there is an array of three (3) LED light sources 401'. Here, the waveguide that extends on either side of the LED light sources 401' is a single waveguide. Again, still other embodiments will be known of skill in the art in light of this disclosure.

Referring to FIG. 5, an alternative embodiment of the luminaire 500 is shown. In this embodiment, the light source 501 is directly coupled into the waveguides 503 which extend downward and outwardly from the light source 501. In this embodiment, the directional light-emitting element 502 is defined on the underside of the waveguide 503 such that it emits directional light 502a as shown. The distal end 503a of the waveguide 503 is configured with a light-emitting surface 504 on the upward-facing side such that the non-directional light-emitting element 504 emits non-directional light 504a upward and outward from the luminaire 500 as shown. In this particular embodiment, the waveguides 503 are discrete and are pivotally attached to the light source 501 such that they can move independently with respect to the light source 501.

Considering FIG. 5 in greater detail, FIG. 5 shows a luminaire 551 having a single point light source engine 552, a first waveguide portion $554_1$, a second waveguide portion $554_2$, a first waveguide pivot $553_1$, and a second waveguide adjustment pivot $553_2$. As show in the side view, luminaire 551 emits a substantial amount of available light intensity from single point light source engine 552 through waveguide portions $554_1$ and $554_2$ as a first downward light portion $560_1$ and a second downward light portion $560_2$, respectively. Downward light portions $560_1$ and $560_2$ can serve a functional purpose (e.g., lighting a table top) in some embodiments. Luminaire 501 can also emit a first indirect light portion $570_1$ and a second indirect light portion $570_2$ through waveguide portions $554_1$ and $554_2$, respectively. Indirect light portion $570_1$ and indirect light portion $570_2$ can serve a secondary purpose, such as providing ambient light or an aesthetic glow around waveguide portions $554_1$ and $554_2$ of luminaire 551. waveguide portions $554_1$ and $554_2$ can be designed with various features (e.g., surface structures, translucency gradients, color gradients, etc.) and adjusted using waveguide pivots $553_1$ and $553_2$ to provide control of the attributes (e.g., direction, intensity, color, etc.) of downward light portions $560_1$ and $560_2$ and indirect light portions $570_1$ and $570_2$.

Specifically, in some embodiments, waveguide; portions $554_1$ and $554_2$ can utilize waveguide pivots $553_1$ and $553_2$, respectively, to rotate about an axis normal to the side view and centered at waveguide pivots $553_1$ and $553_2$, respectively. Such rotation allows direct control of the direction of downward light portions $560_1$ and $560_2$ and indirect light portions $570_1$ and $570_2$. For example, the table top area covered by downward light portions $560_1$ and $560_2$ can be increased by an outward rotation of waveguide portions $554_1$ and $554_2$, increasing the inner distance between the two waveguide portions. Additionally, waveguide portions $554_1$ and $554_2$ can have a light transition area at which light from single point light source engine 552 can be transmitted into both waveguide portions $554_1$ and $554_2$. More specifically, in some embodiments, at least a portion of single point light source engine 552 can be embedded, potted or bonded to waveguide portions $554_1$ and $554_2$ to eliminate air gaps, decrease surface reflections and/or eliminate any lens effect between single point light source engine 552 and waveguide portions $554_1$ and $554_2$, thereby reducing light loss and increasing the light output from waveguide portions $554_1$ and $554_2$. Further, in some embodiments, waveguide portions $554_1$ and $554_2$ can include reflective or refractive surfaces (e.g., prismatic structures) for changing the path of a portion of the light from single point light source engine 552 that would not normally enter waveguide portions $554_1$ and $554_2$ at an acceptable angle, allowing light to remain in waveguide portions $554_1$ and $554_2$ for a longer period of time and/or increase the efficiency of waveguide portions $554_1$ and $554_2$. In some embodiments, waveguide portions $554_1$ and $554_2$ can also include a pattern of light extracting deformities or disruptions (e.g., prismatic structures) which provide a desired light output distribution (e.g., downward light portions $560_1$ and $560_2$ and indirect light portions $570_1$ and $570_2$) from waveguide portions $554_1$ and $554_2$ by changing the angle of refraction of a portion of the light from one or more light output areas of waveguide portions $554_1$ and $554_2$. For example, indirect light $570_1$ and $570_2$ from waveguide portions $554_1$ and $554_2$, respectively, can be controlled to emit only in an upward direction or horizontally from the edge, or any combination of these directions.

Figure 6A:
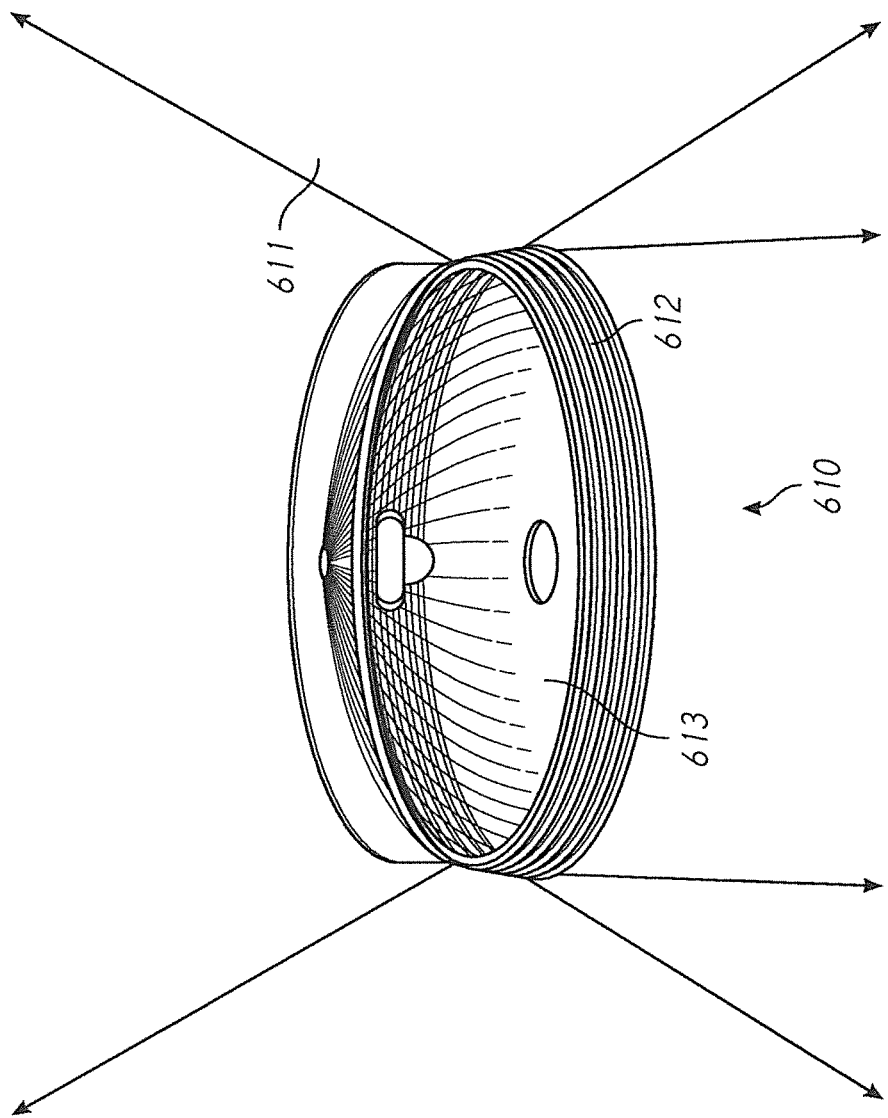
FIGS. 6A-6P show various renderings of different embodiments of the luminaire of the present invention to illustrate the directional light and the non-directional light.
Figure 6B:
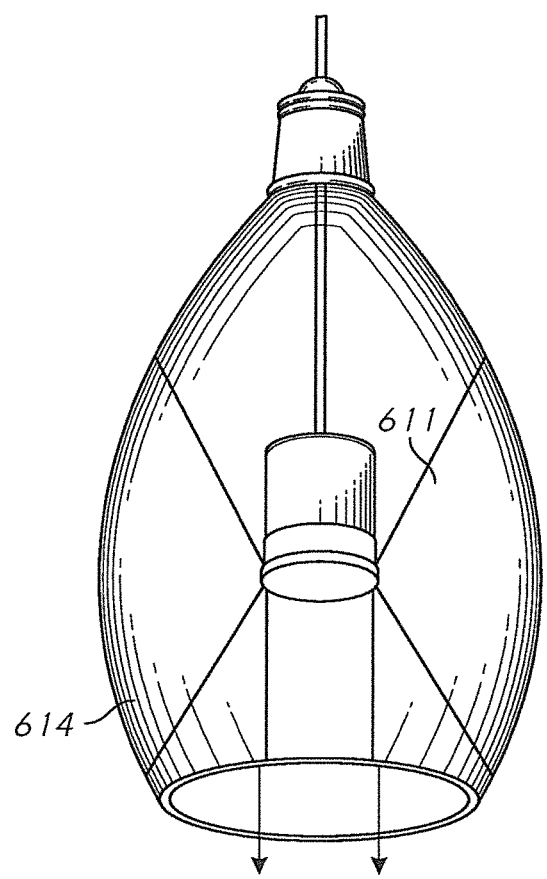
Figure 6C:
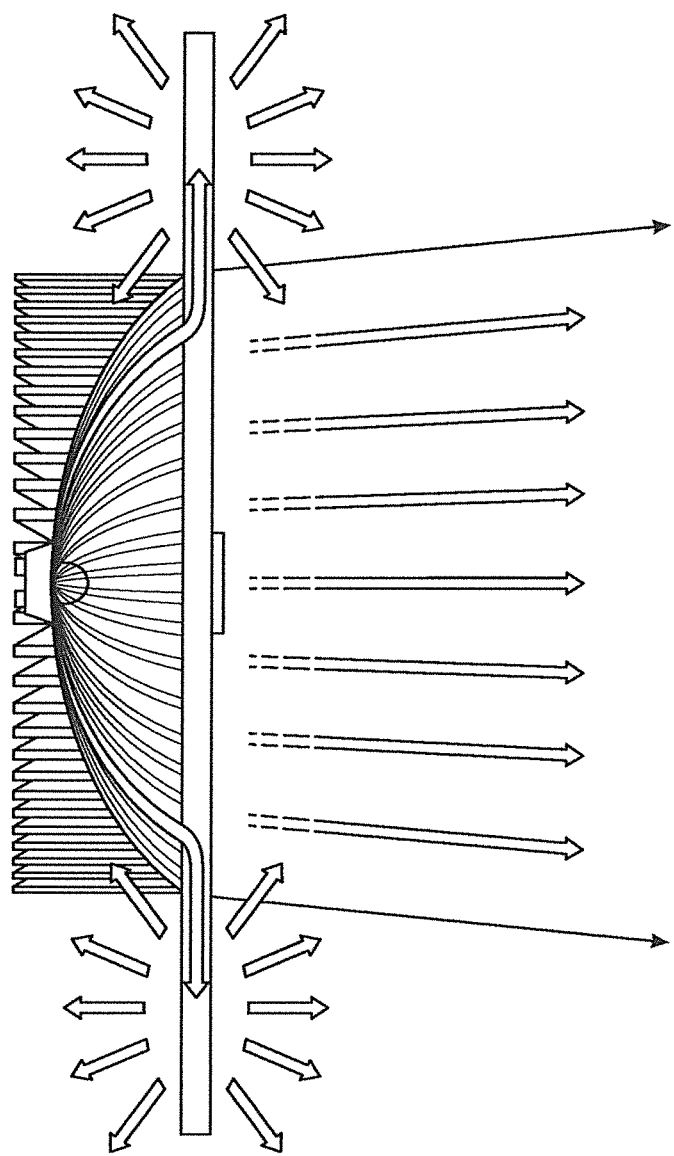
Figure 6E:
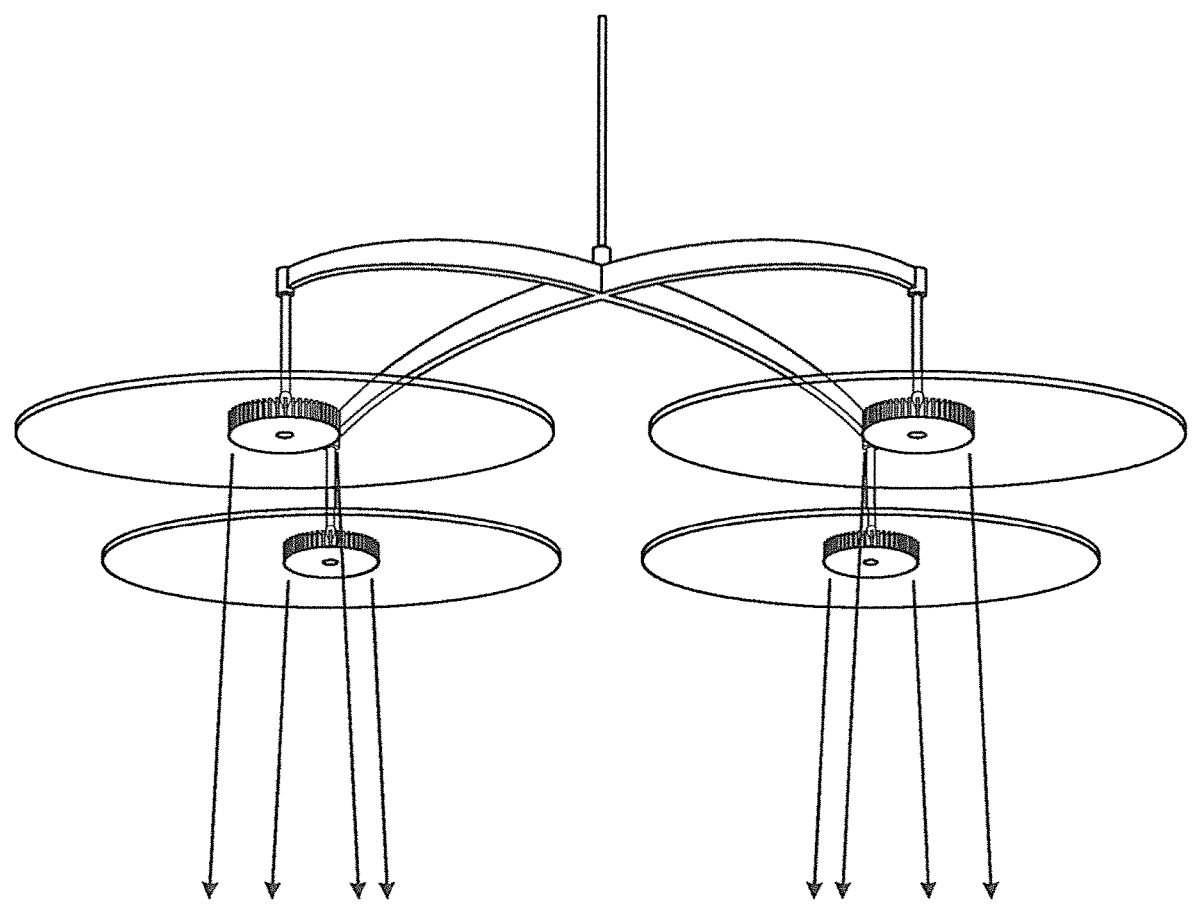
Figure 6F:
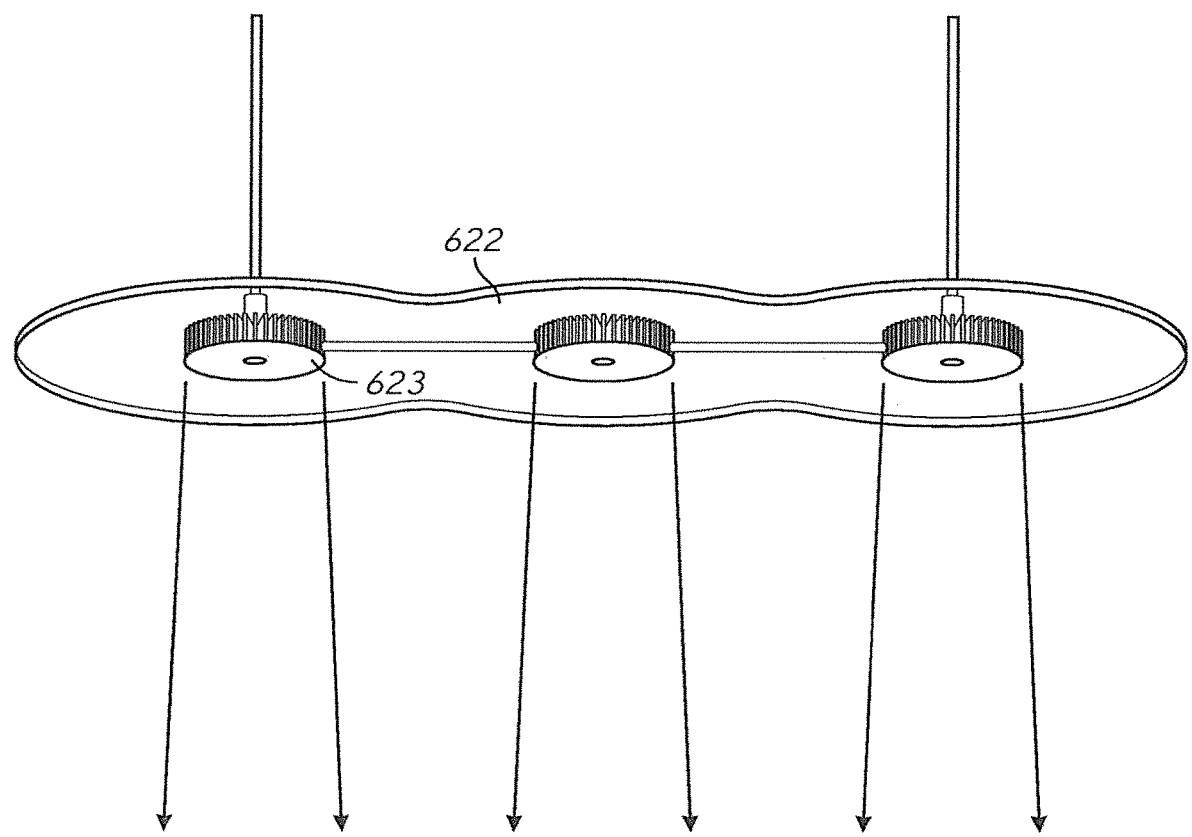
Figure 6G:
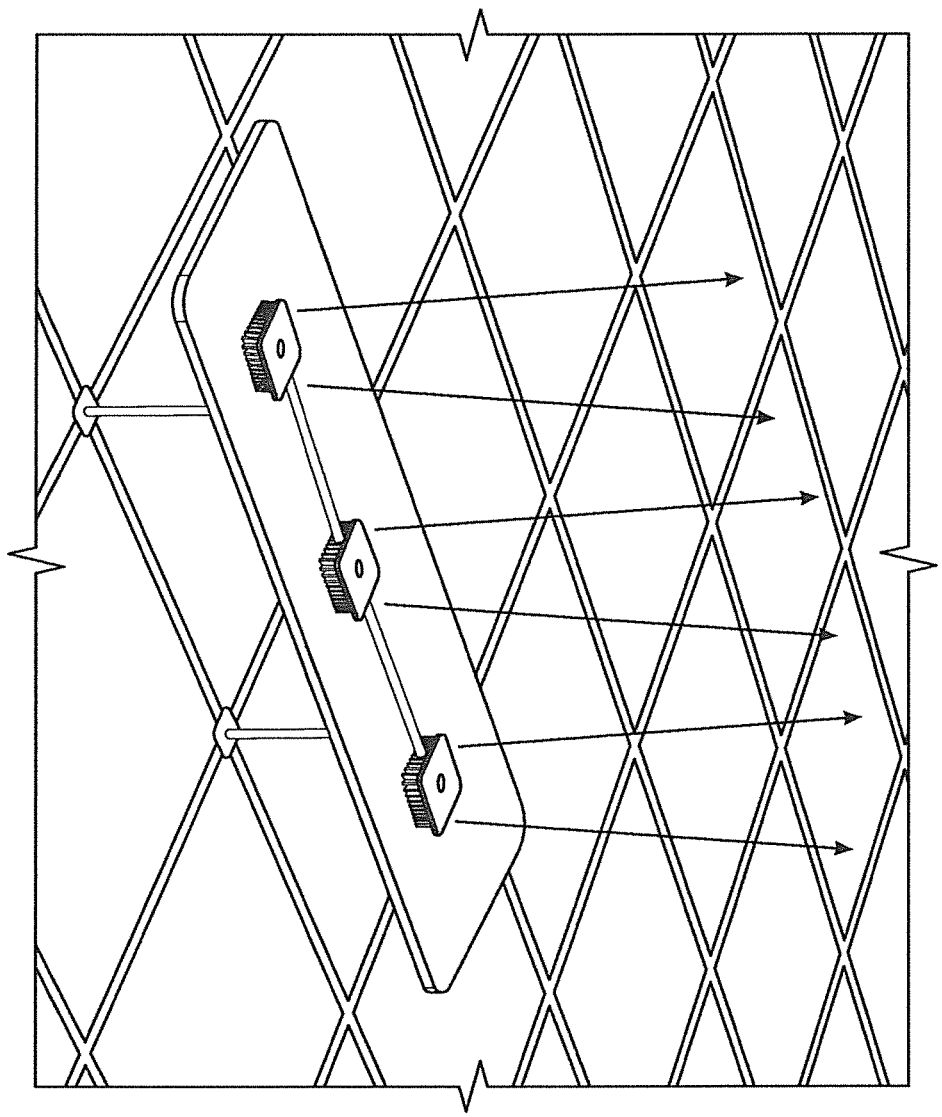
Figure 6H:
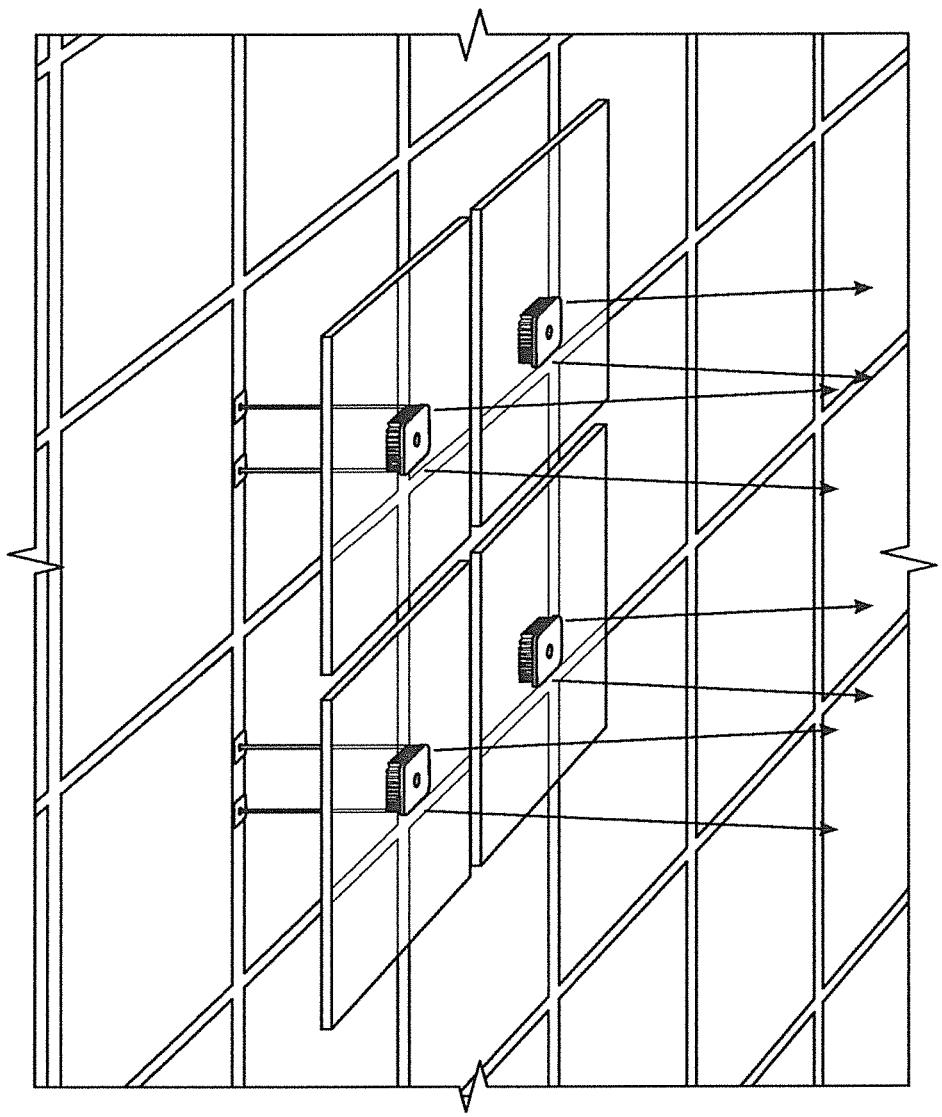
Figure 61:
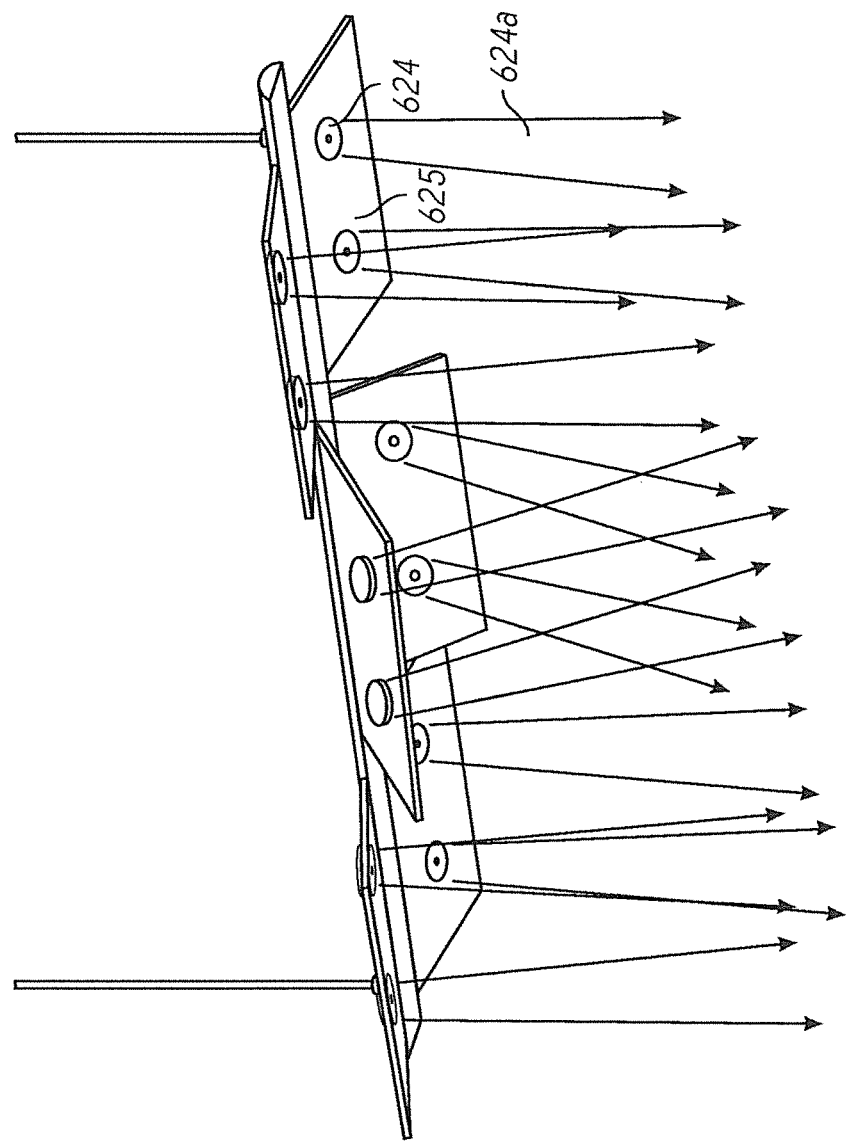
Figure 6J:
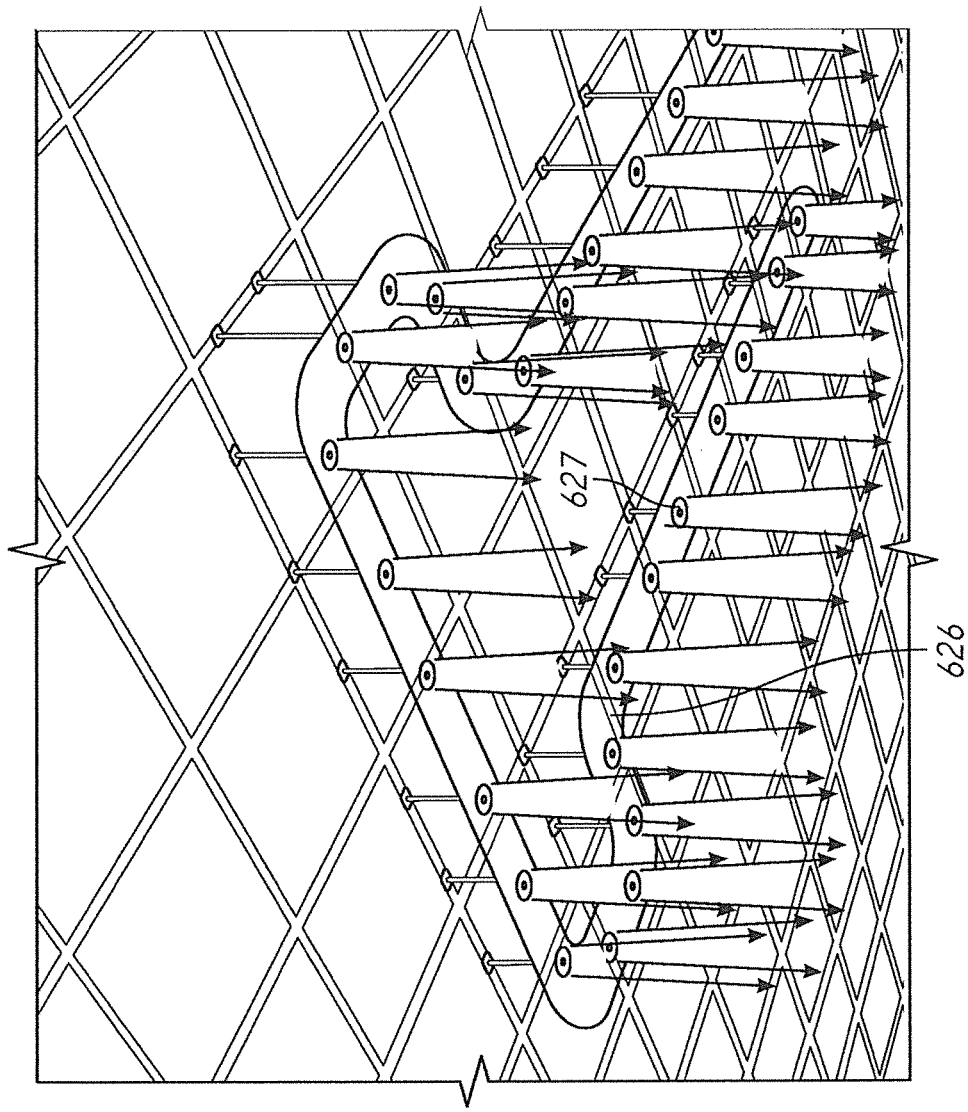
Figure 6K:
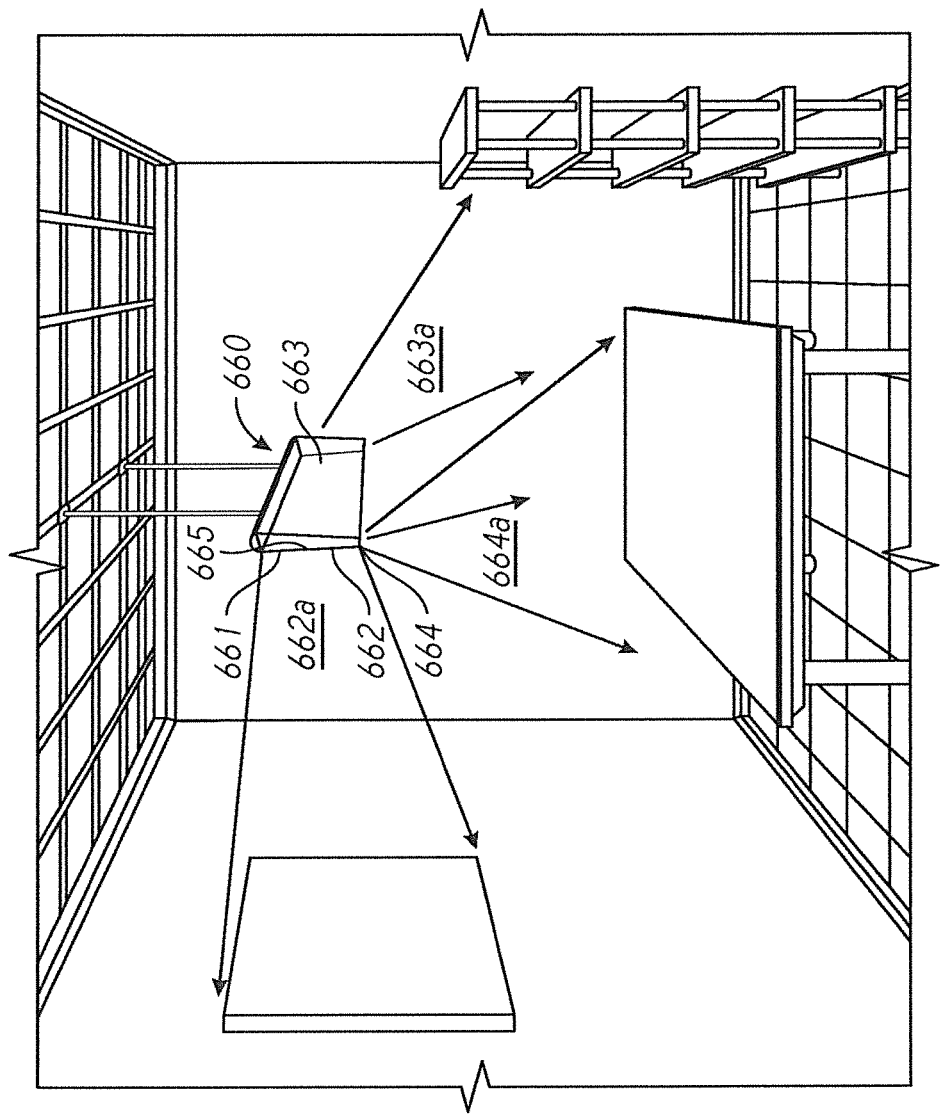
Figure 79:
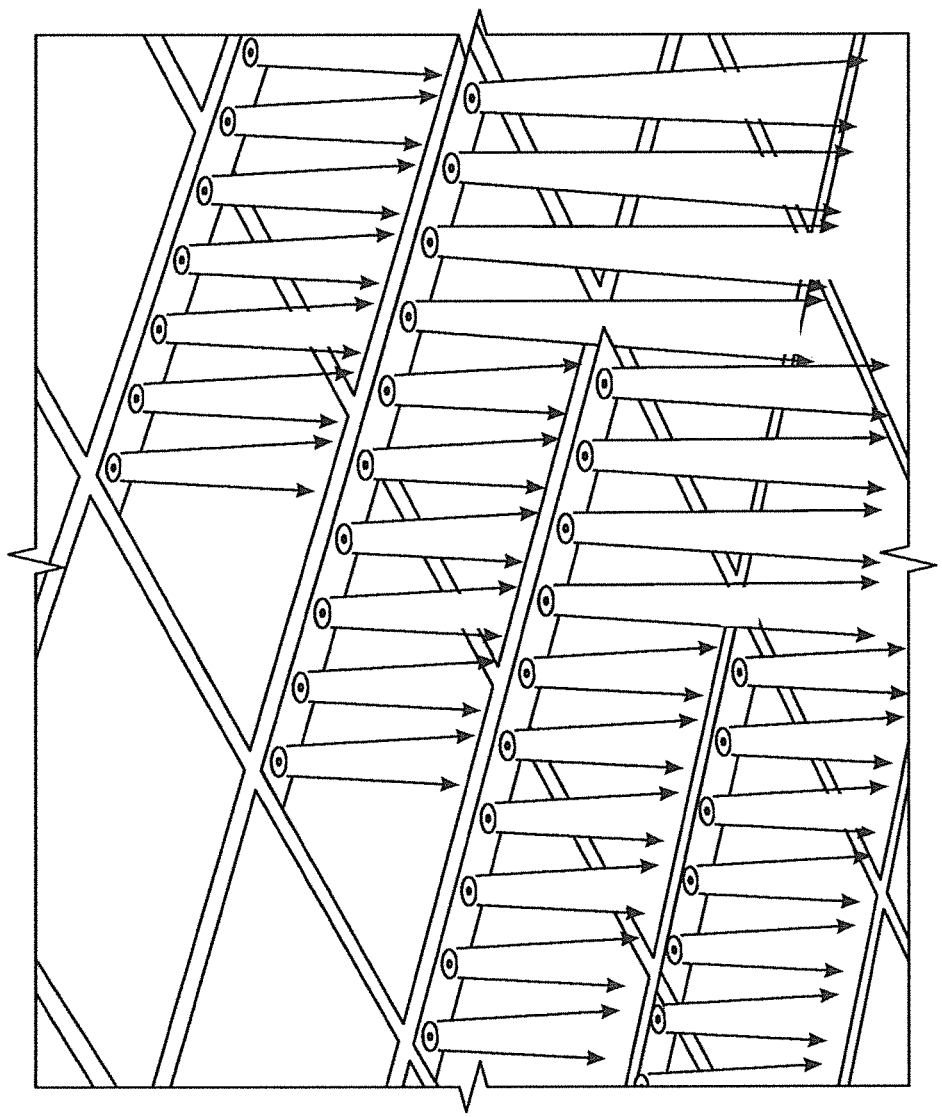
Figure 6M:
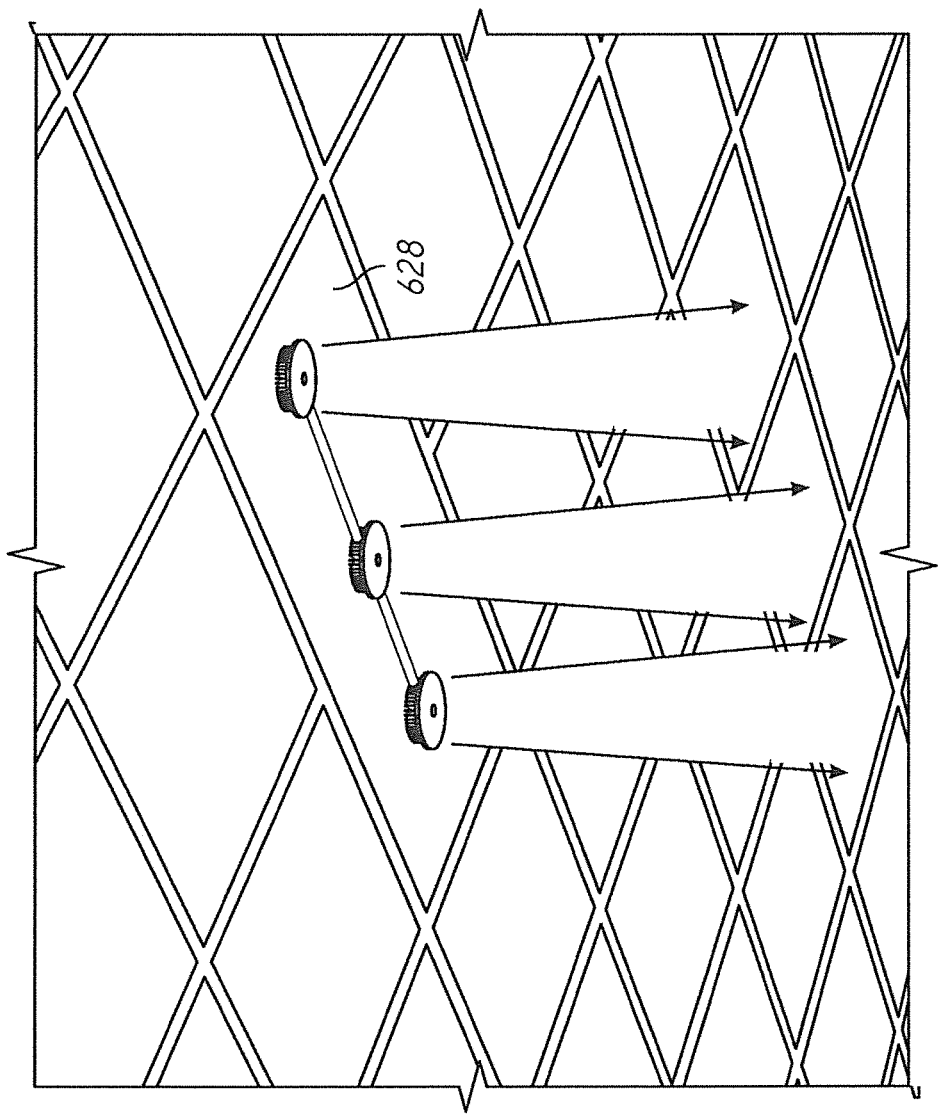
Figure 6N:
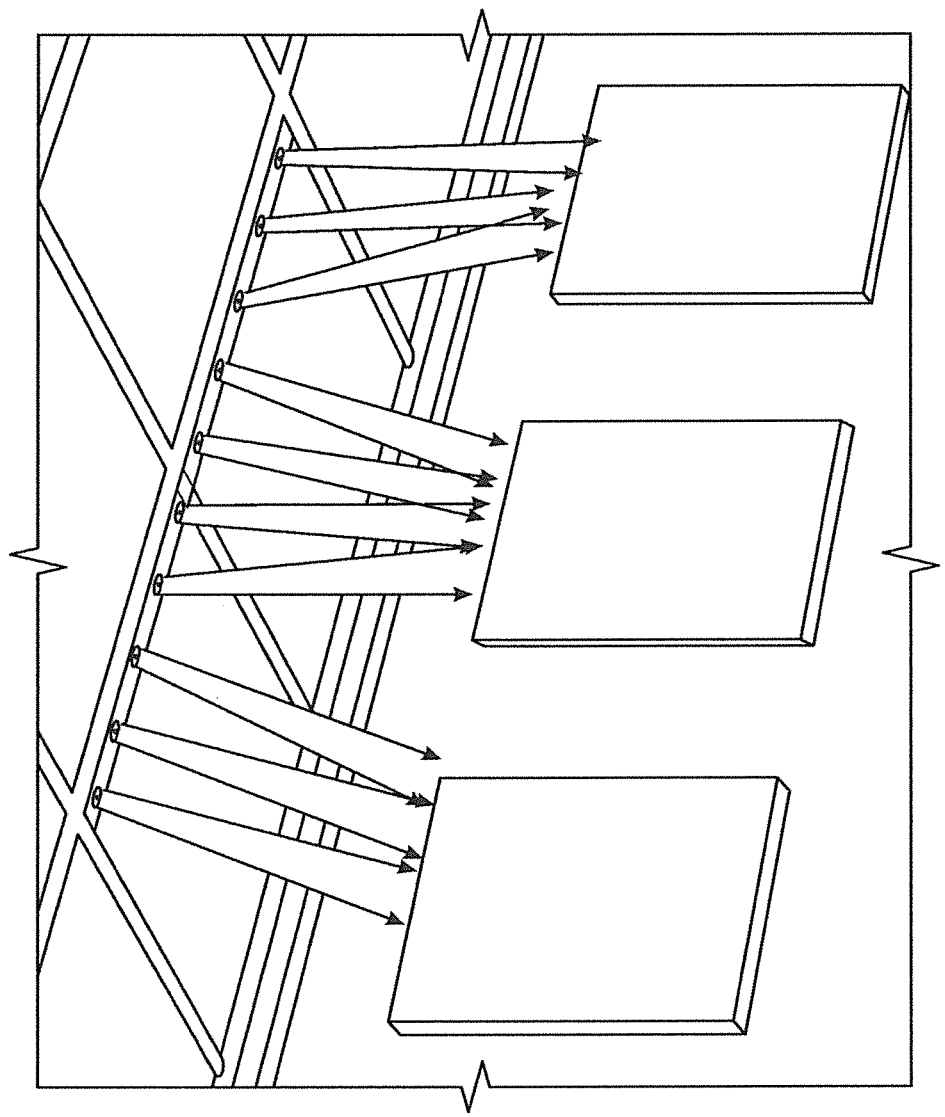
Figure 60:
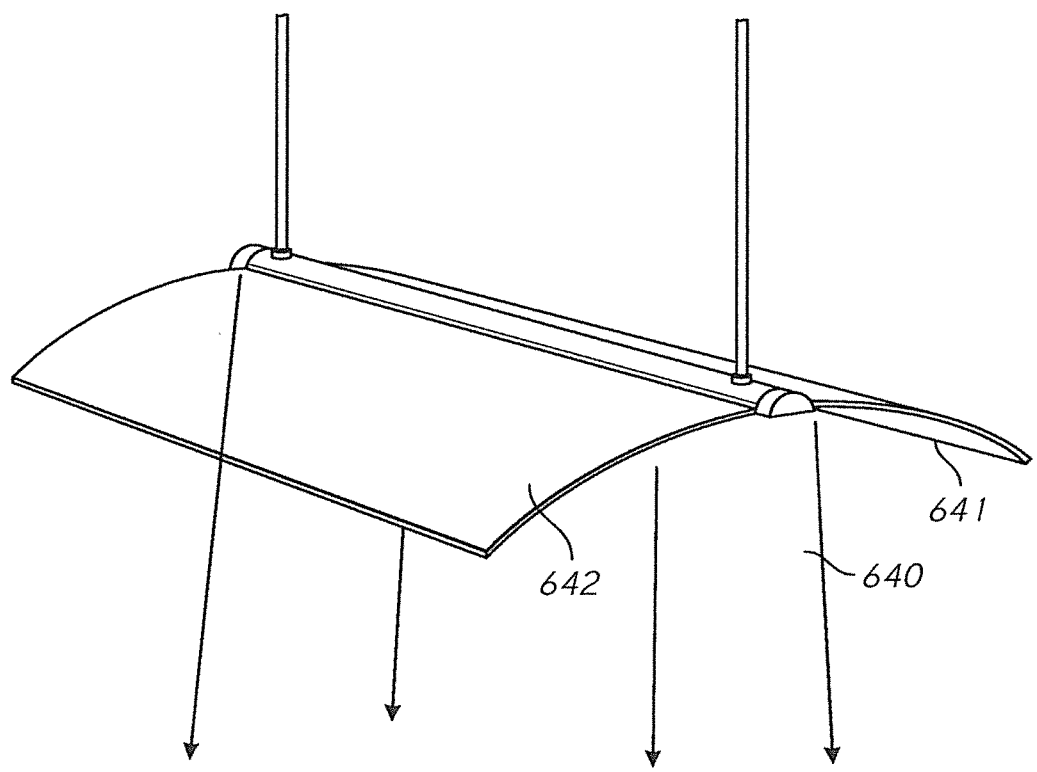
Figure 6P:
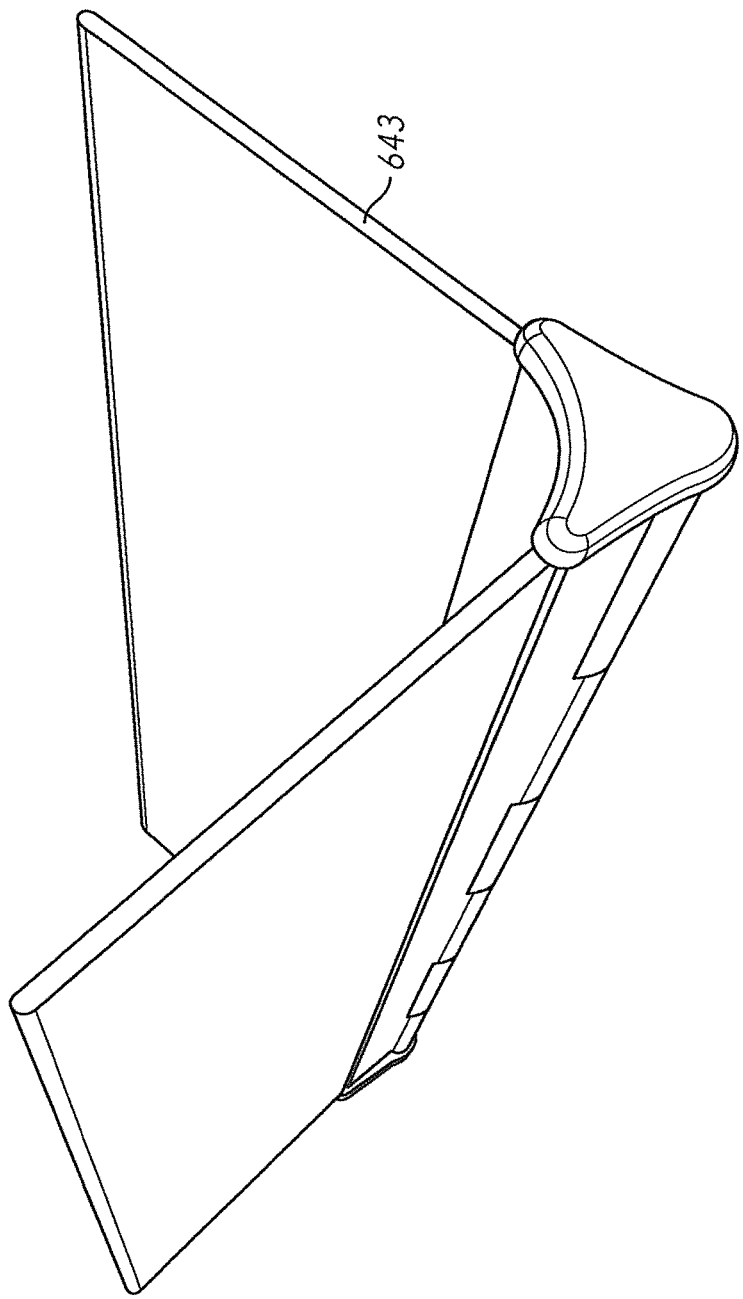

FIGS. 6A-6P show various renderings of different embodiments of the luminaire of the present invention, to illustrate the directional light and the non-directional light.

FIGS. 6A through 6B depict various embodiments of the luminaire of the present invention in which the non-directional light-emitting element is disposed on edge of the luminaire to diffuse light along the perimeter of the luminaire. In FIG. 6A the luminaire is shown having a directional light-emitting element 613 emitting directional light 610 downward, and a non-directional light-emitting surface 612 encircling the directional light-emitting element 613 and emitting non-directional light 611 outwardly from the edge of the luminaire. FIG. 6B shows a luminaire similar to the of FIG. 6A in which the luminaire of 6A is incorporated into a larger lamp structure 614 such that the non-directional light 611 is incident upon the lamp structure 614 to illuminate it.

FIGS. 6C-6C2 show different embodiments of the luminaire in which the non-directional light-emitting element encircles the directional light-emitting element, and emits non-directional light in various ways i.e., downward, outward and/or upward. FIG. 6C is a ray diagram showing the configuration of the luminaire 300 of FIG. 3A which is shown in perspective view in FIG. 6C1. Specifically, a circular waveguide 615 encircles the directional light-emitting element 617, and the non-directional light-emitting element 618 is the top and bottom surfaces of the waveguide 616. As shown, this embodiment demonstrates how the directional light-emitting element 617 emits a directional light while the non-directional light-emitting element 618 emits a diffuse light. The embodiment of FIG. 6C2 is similar to FIG. 6C1, except only the bottom of the waveguide 616 is configured as the non-directional light-emitting element.

FIGS. 6D1-6D2 show embodiments of the luminaire of the present invention in which the waveguide encircles and directional light-emitting element and provides a shade for the directional light. Specifically, FIG. 6D1 shows an embodiment in which the waveguide 619 encircles the directional light-emitting element 620 and extends downward in a traditional conical lamp shape to emit diffuse light on the interior of the waveguide structure 619, thus mimicking a shade. Referring to FIG. 6D2 another luminaire is shown similar to that of FIG. 6C, but with the waveguide 621 extending down in a rectilinear lamp shade configuration.

FIGS. 6E-6J show embodiment in which a hanging luminaire is comprised of multiple directional light-emitting element. In FIG. 6E, an assembly multiple luminaires such as those disclosed in FIG. 6B is shown. Referring to 6F, another embodiment is shown in which a common undulating waveguide 622 envelopes a plurality (3) directional light-emitting elements 623 to provide diffuse light around each of the directional light-emitting elements 623. Referring to 6G, a luminaire similar to that of FIG. 6F is disclosed in which the waveguide is not undulating but rather rectalinear. Referring to FIG. 6H, a luminaire is disclosed comprising an array of luminaires such as those disclosed in FIG. 3B. Referring to FIG. 6I, another luminaire is disclosed in which the luminaire comprises a plurality of independently movable waveguides 625. A plurality of directionallight-emitting elements 624 are disclosed on each waveguide 625. The waveguides 625 are configurable such that they can be moved independently of other waveguides 625 of the luminaire, thereby individually controlling the direction of the directional light 624A of each waveguide 625.

Referring to FIG. 6J, another embodiment of luminaires disclosed in which a single waveguide or sections of waveguide are combined to form a single waveguide 626 containing plurality of directional light-emitting elements 627. In this embodiment, as in some of the others, the directional light-emitting elements each comprise an LED light source (not shown). It should be understood from FIG. 6J that various embodiments of this configuration can be used to essentially snake through an office providing both high intensity directional light with a background of diffused light to thereby minimize glare as discussed above.

FIGS. 6L-6M shows luminaires having multiple directional light-emitting element configured to be integrated with a typical drop ceiling. Referring to FIG. 6M an embodiment in which the luminaire is configured having the same form factor as a conventional drop-ceiling fluorescent light. In this embodiment, the waveguide 628 is rectilinear and serves to provide a diffused background for the directional light-emitting element and thereby eliminate glare.

FIG. 6N shows luminaires that the emitted directional light from the directional light-emitting elements is individually controllable so that the directed light may be focused on artwork or similar objects along the wall or in the room.

FIGS. 6O-6P show different embodiments of an overhead luminaire, having a directional light-emitting element running down the center of the luminaire to emit a thin directional beam 640, and non-directional light 641 emitting above and below the waveguides 642 that extends downward on either side of the directional light-emitting element. The embodiment of FIG. 6P is similar to that of FIG. 6O, except the waveguides extend upwardly.

Referring to FIG. 6K, an embodiment is shown in which a luminaire 660 is configured with a wedge-shaped waveguide 661. Different sides/edges of the waveguide are configured with various directional light emitting elements 662-664 to focus directed light 662a, 663a, and 664a on various objects in the room. Optionally, an edge 665 of the waveguide is configured to have a non-directional light-emitting element to emit diffuse light into the room. Still other embodiments will be known or obvious to one of skill in the art in light of this disclosure.

Figure 8:
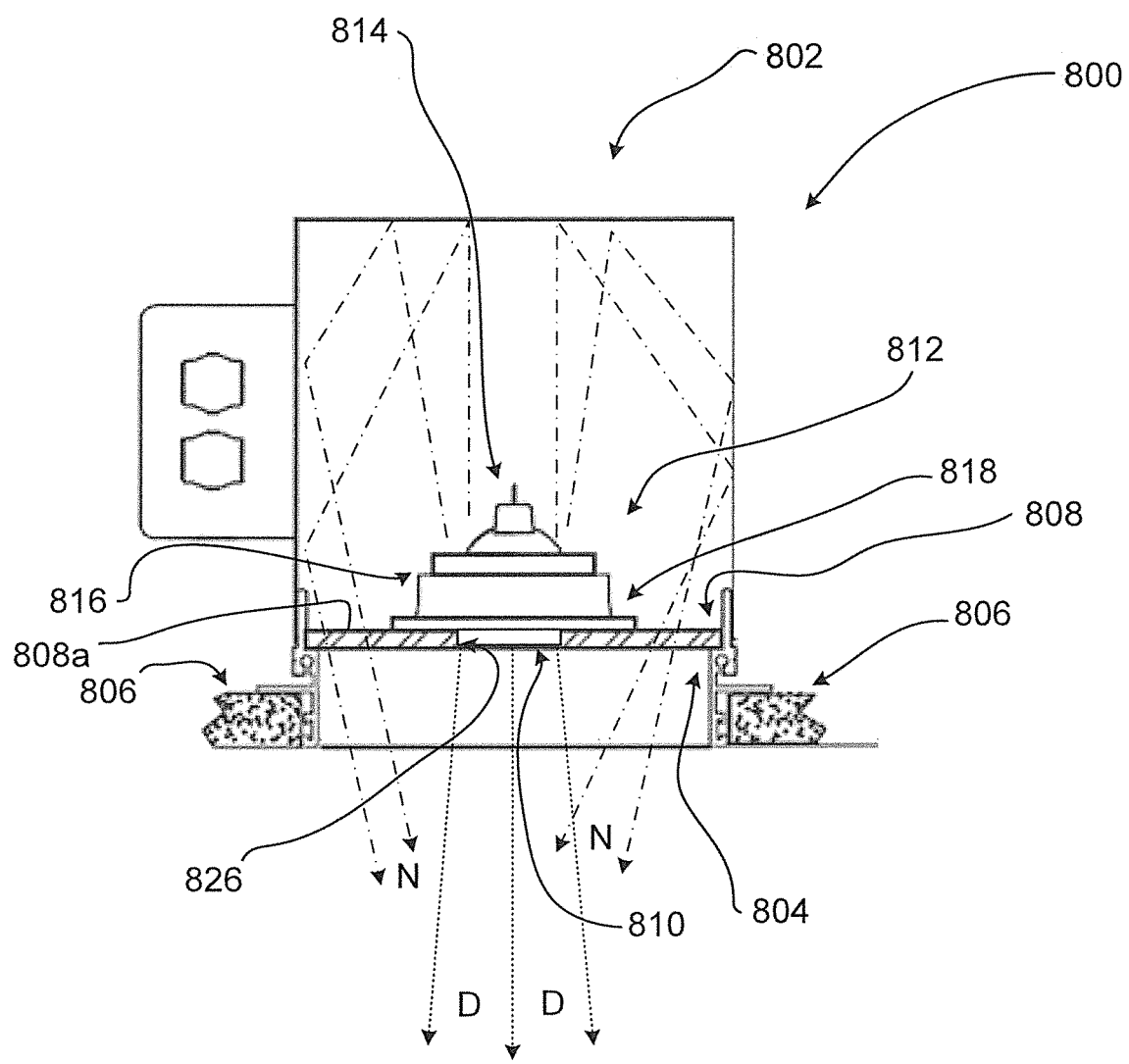
FIGS. 8 to 10A show embodimentsof LED luminaires of the present invention.
Figure 9:
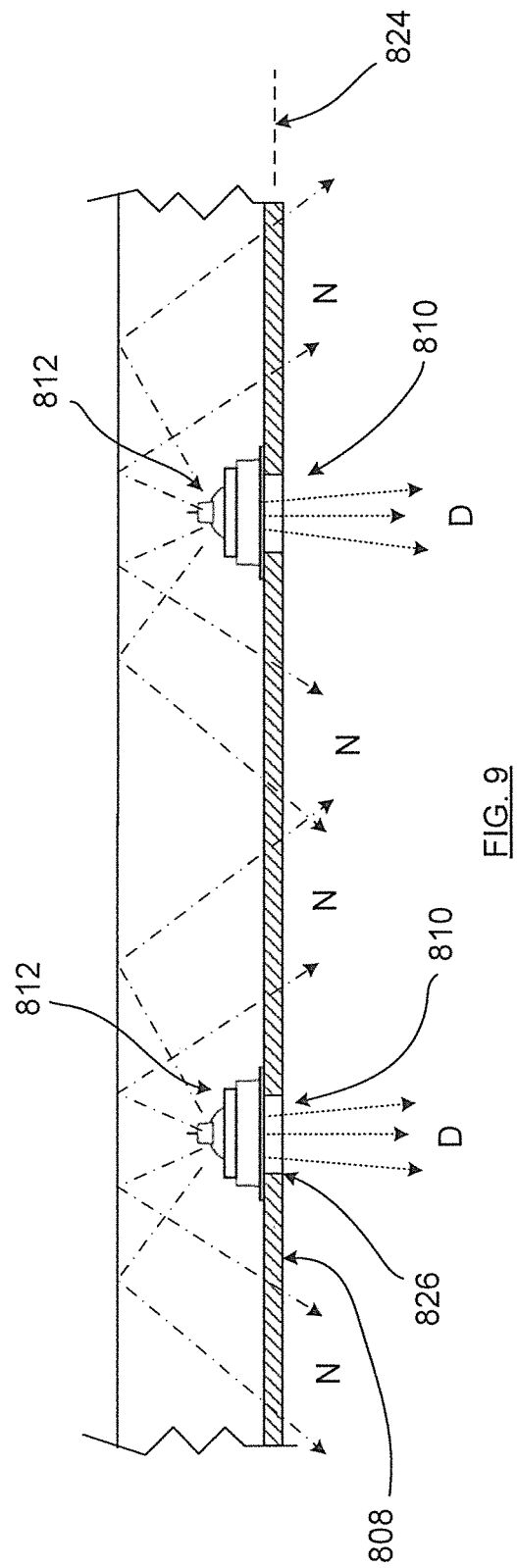

FIGS. 8 and 9 show, in cross section, another embodiment in the form of LED luminaire 800, comprising a recessed luminaire housing 802 defining a light output region 804 adjacent one or more ceiling tiles or other ceiling structures shown at 806. Other non-recessed configurations may also be deployed, such as with pendant luminaires as shown for instance in one or more of FIGS. 6A to 6F, in which the light output region 804 is not adjacent ceiling tiles or other ceiling structures. A light guide 808 is configured to be located at, or near, the light output region 804 and defines at least one, in this case a plurality of directional light source locations 810 thereon, as shown in FIG. 9.

At least one LED light engine is provided at 812 and is located within the luminaire housing 802. The LED light engine 812 includes at least one first LED light source 814. A shroud is provided at 816 which has a shroud periphery 818 and is configured to operatively position the first LED light source 814 therein and inwardly spaced from the shroud periphery 818. Thus, in this embodiment, the at least one LED light engine is, when viewed in FIG. 8, above the upper surface 808a, so that the entire thickness of the light guide 808 is below the at least one LED light engine.

The shroud periphery 818 is positionable adjacent the light guide 808 at the directional light source location 810, to deliver the directional light (as shown by arrows D) via the directional light source location 810 (and in this case transversely through the light guide 808) to a target location (not shown), in a target region beyond the luminaire 800.

The light guide 808 is further configured to optically couple with a source of light from within the housing 802 to define a non-directional light output to deliver non-directional light (as schematically shown by arrows N) in this case toward the target region. In the embodiment of luminaire 800, the source is the first LED light source.

Figure 9A:
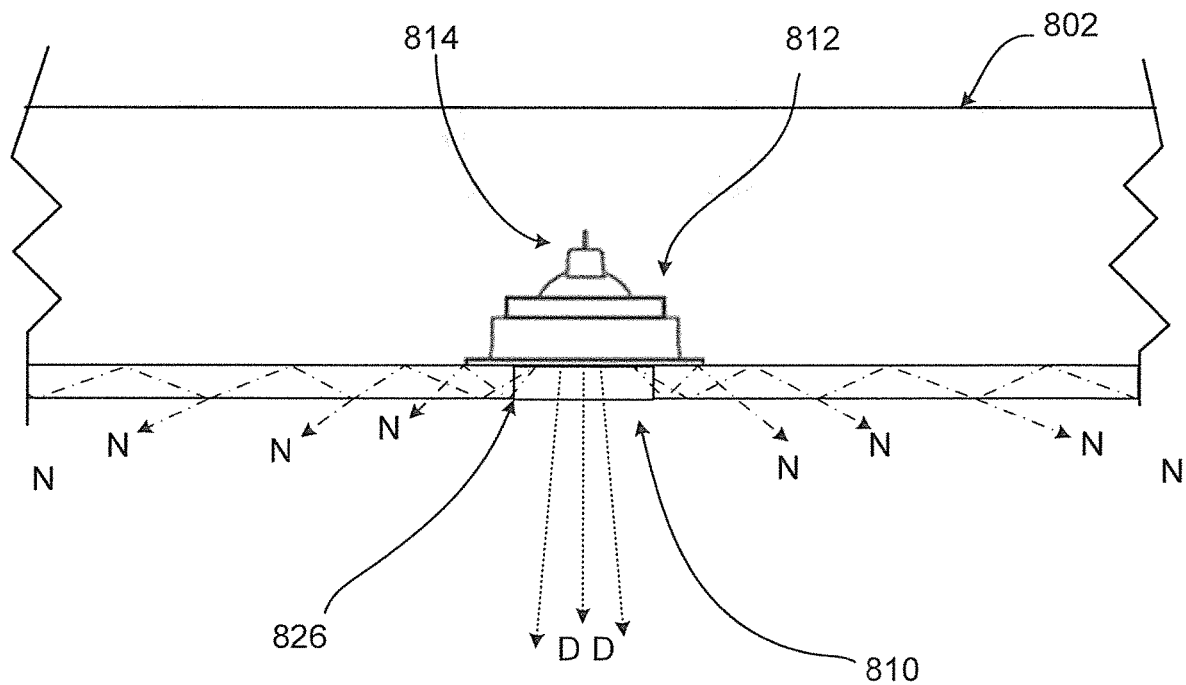

In an embodiment shown in FIG. 9A, the first LED light source 814 may also be configured to deliver non-directional light to the light guide 808 to be propagated along the light guide and to emit non-directional light N therefrom by way of optical characteristics of the light guide as discussed hereinabove for this purpose. In this case, the light guide 808 may be configured to receive light from other sources in the housing 802 to be emitted as non-directional light N.

Figure 9B:
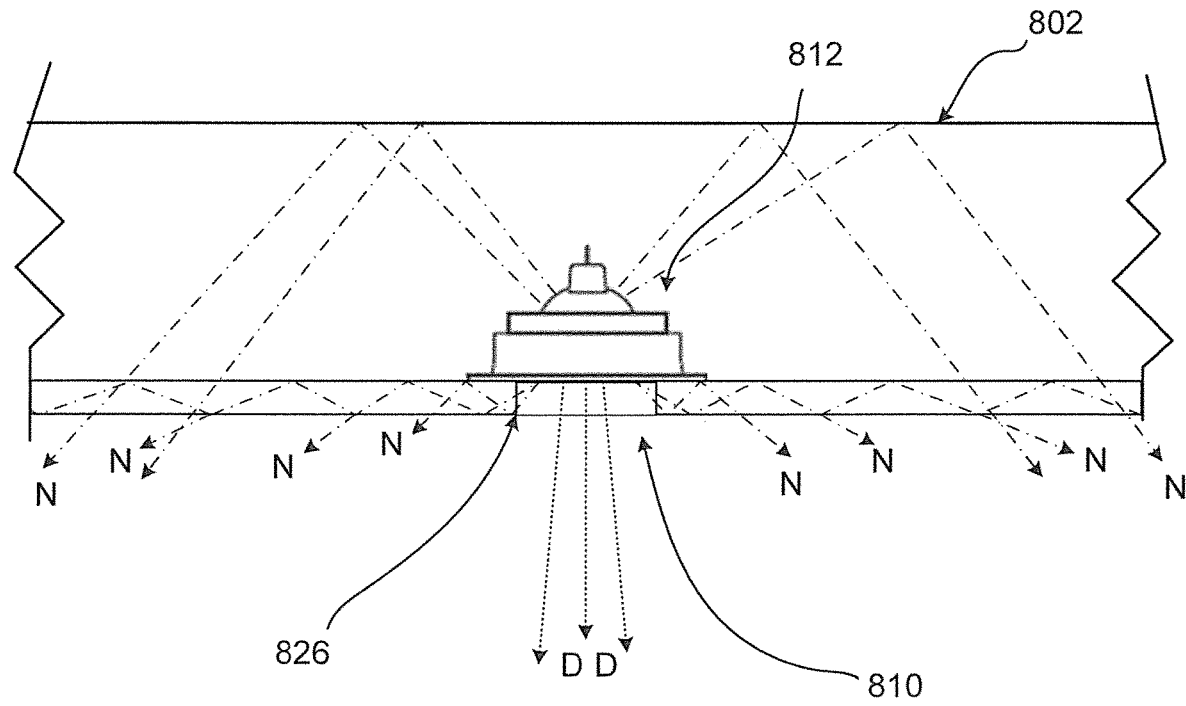

In an embodiment shown in FIG. 9B, the first LED light source 814 may also be configured to direct light into the housing 802 to be reflected back to the light guide and emitted therefrom also as non-directional light N.

Another embodiment is shown, in cross section, in FIG. 10 in the form of luminaire 830, in which the source is a second LED light source 832, as will be further discussed hereinbelow.

Referring to FIG. 9, the light guide 808 extends along a path 824. In this embodiment, a plurality of LED light engines are provided at 812, each of which is associated with a corresponding directional light source target location 810. The directional light source locations may be arranged in a designated pattern on the light guide 808 to provide a desired optical effect. For instance, the pattern may be in the form of single or multidimensional array, such as in a planar or nonplanar linear, curved, circular or other configuration, examples of which may be seen in FIGS. 6A to 6P as well as others.

Referring to FIG. 8, the shroud periphery 818 may be secured to the light guide 808 adjacent the directional light source location 810, by way of a flange which may be fused by chemical, ultrasonic or other bonding/welding techniques to a surface region of the light guide 808. The directional light source location 810, in this case, includes a passage 826 through the light guide within (i.e. inside the circumference of) the shroud periphery 818. In this case, the first LED light source and/or the shroud is configured to deliver directional light transversely through the passage 826.

In the embodiment of FIG. 8, the light guide 808 is configured to optically couple with the first LED light source 814, via a path external to the shroud 816 but within the luminaire housing 802, such as shown by the plurality of chain-dotted arrows N emanating from the first LED light source 814 into the luminaire housing 802, reflecting off the inner surfaces thereof and back toward the light guide 808. In this case, the shroud 816 may be configured to direct (or redirect) a portion of LED light from the first LED light source into the space of the luminaire housing 802.

Figure 10:
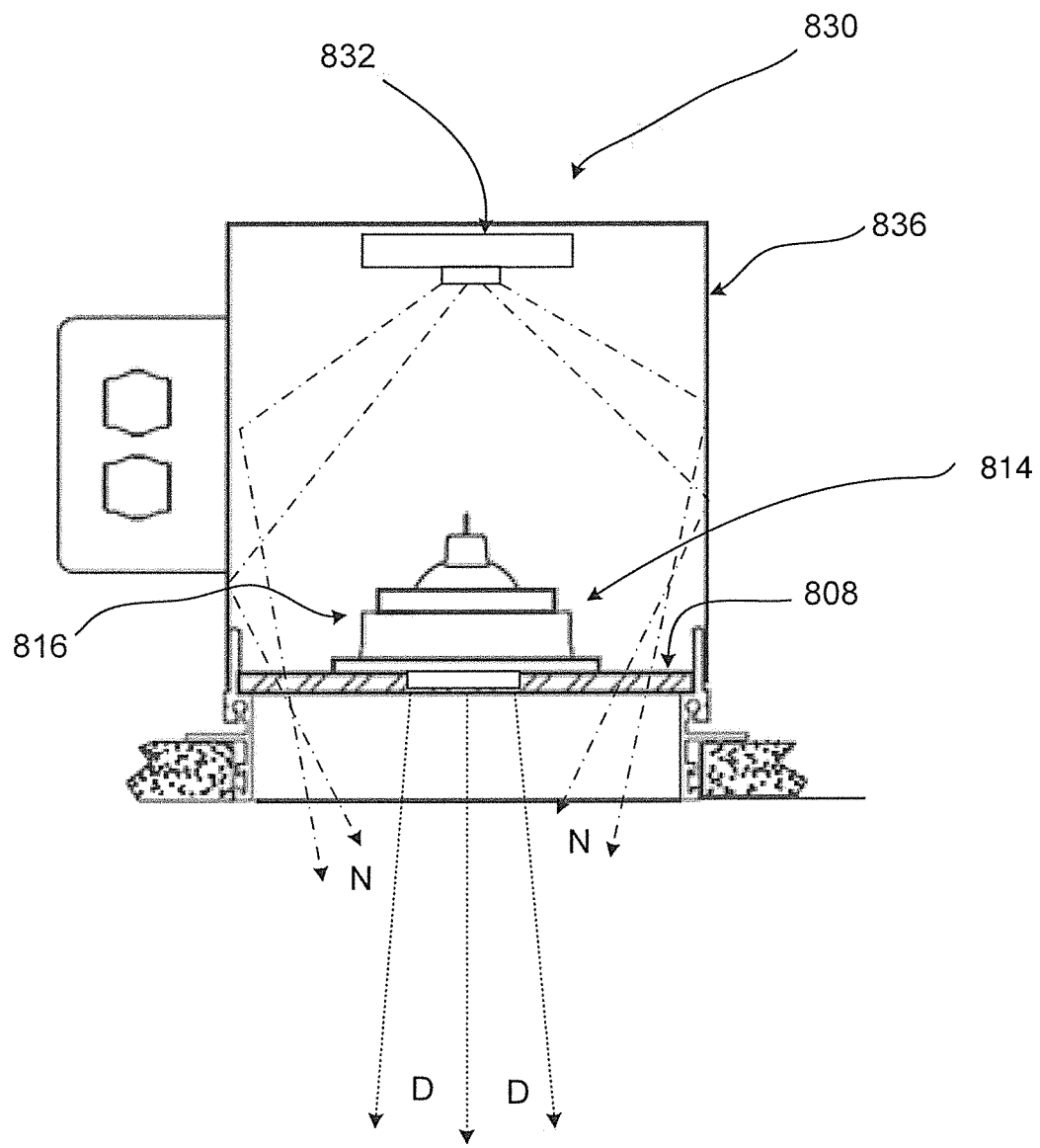

In the embodiment of FIG. 10, as mentioned above, the luminaire 830 provides a second LED light source 832 located so as not to be within the shroud 816 but within the luminaire housing 836, in this case mounted at a designated location in the luminaire housing 836, such as in an upper region thereof to direct light toward the light guide 808 for optical coupling therewith to deliver the non-directional light.

Figure 10A:
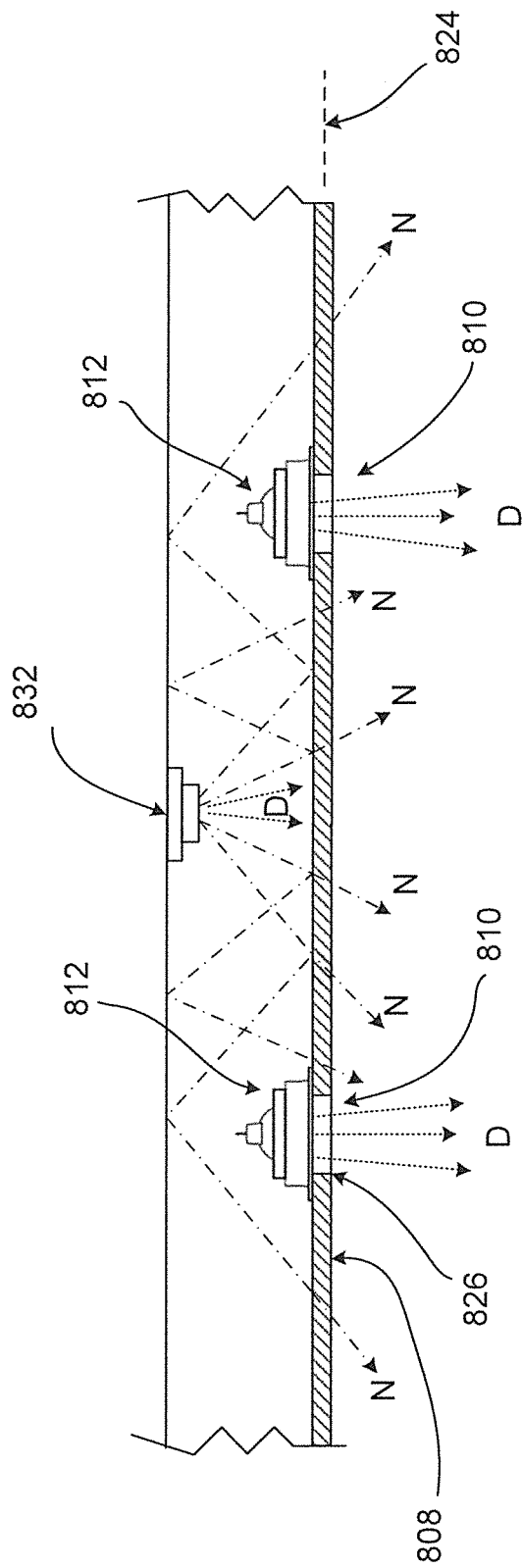

Referring to FIG. 10A, the second light source 832 may also provide directional light D to propagate through the light guide, either as a supplement or an alternative to the directional light D from the first light source 814.

The arrows D and N in FIGS. 8 to 10A are schematic only, it being understood that actual ray paths will depend on such things as the optical geometry and/or characteristics of the light guide 808, the first LED light source 814, the second LED light source 832, the interior surfaces of the luminaire housing 836 and the like.

Thus, luminaires in some embodiments may provide both a directional (direct) point source together with non-directional (indirect) light, thus combining accent or task lighting with general lighting in the same plane and, in this instance, in the same luminaire. Further, as shown in luminaire 800, some embodiments may derive both indirect and direct light from the same light source. This may permit the colour of the indirect and direct sources to be matched, providing better performance to previous products, and in some cases at reduced cost.

Some embodiments as shown by luminaires 800 and 812 may provide a housing positionable at a building structure location, which may be a ceiling or a wall and in a designated operable recessed, pendant or externally positioned relative thereto. The housing may have at least one light output boundary which is configured to reflect light therein toward the light output boundary. A light guide may also be provided which is configured to be located at the light output boundary to receive light operationally contained within the housing, so as to emit non-directional light at the light output boundary. In addition, at least one first LED light engine may be located within the luminaire housing, wherein the at least one first LED light engine includes at least one first LED light source to emit directional light at the light output boundary.

In some embodiments, the at least one first LED light engine may include a reflective shroud to emit the directional light toward a directional light source location on the light guide. In some cases, the shroud may be in contact with an internally exposed surface of the light guide and the shroud may be affixed to the internally exposed surface. The directional light source location may include a passage through the light guide.

In some embodiments, the shroud may be configured to emit or direct a portion of light from the LED light source into the housing to provide the light operationally contained within the housing.

In some embodiments, at least one second LED light source may be provided in the housing and configured to emit the light operationally contained within the housing to be emitted from the light guide as non-directional light and/or configured to emit directional light toward and through the light guide.

Some embodiments may also provide a luminaire providing a light output boundary, in which the luminaire may comprise an LED engine adjacent the light output boundary. A wave guide may face, at least in part, the LED engine and be adjacent the light output boundary for receiving a portion of the output from the LED engine. The wave guide may have a removed portion which permits the transmission of directional light from the LED engine, and the wave guide may provide non-directional light from the received portion of output.

While this description is made with reference to exemplary embodiments, it will be understood by those skilled in the art that various changes may be made and equivalents may be substituted for elements thereof without departing from the scope. In addition, many modifications may be made to adapt a particular situation or material to the teachings hereof without departing from the essential scope. Also, in the drawings and the description, there have been disclosed exemplary embodiments and, although specific terms may have been employed, they are unless otherwise stated used in a generic and descriptive sense only and not for purposes of limitation, the scope of the claims therefore not being so limited. Moreover, one skilled in the art will appreciate that certain steps of the methods discussed herein may be sequenced in alternative order or steps may be combined. Therefore, it is intended that the appended claims not be limited to the particular embodiment disclosed herein.

The invention claimed is:

1. An LED luminaire, comprising:
a luminaire housing defining a light output region;
a light guide located proximate the light output region, the light guide defining at least one directional light source location thereon;
at least one LED light source located within the luminaire including
at least one first LED light source,
a shroud configured to operatively position the first LED light source,
the shroud being positionable adjacent the light guide at the directional light source location, with the at least one first LED light source being spaced from the light guide a predetermined distance defined by the shroud to deliver directional light via the directional light source location to a target location, in a target region beyond the luminaire housing; and
the light guide being optically coupled with the first LED light source in the luminaire housing defining a non-directional light output.

2. An LED luminaire, comprising:
a luminaire housing defining a light output region;
a light guide configured to be located at the light output region, the light guide defining at least one directional light source location thereon;
at least one LED light engine located within the luminaire housing, comprising:
at least one first LED light source;
a shroud having a shroud periphery and configured to operatively position the first LED light source therein and inwardly spaced from the shroud periphery, with the at least one first LED light source being spaced from the light guide a predetermined distance defined by the shroud;
the shroud periphery being positionable adjacent the light guide at the directional light source location, to deliver directional light via the directional light source location to a target location, in a target region beyond the luminaire; and
the light guide being configured to optically couple with a light source in the housing to define a non-directional light output to deliver non-directional light.

3. The LED luminaire of claim 2, wherein the light source is a second LED light source.

4. The LED luminaire of claim 2, wherein the at least one directional light source location includes a plurality of directional light source locations and the at least one LED light engine includes a plurality of LED light engines, each associated with a corresponding one of the directional light source target locations.

5. The LED luminaire of claim 4, wherein the directional light source locations are arranged in a designated pattern on the light guide.

6. The LED luminaire of claim 2, wherein the shroud periphery is secured to the light guide.

7. The LED luminaire of claim 6, wherein the shroud periphery includes a flange which is fused to a surface of the light guide.

8. The LED luminaire of claim 2, wherein the at least one directional light source location includes a passage through the light guide.

9. The LED luminaire of claim 8, wherein one of the first LED light source and the shroud is configured to deliver directional light transversely through the passage light guide.

* * * * *